United States Patent
Ito

(10) Patent No.: US 8,032,505 B2
(45) Date of Patent: Oct. 4, 2011

(54) RELATIVE DOCUMENT REPRESENTING SYSTEM, RELATIVE DOCUMENT REPRESENTING METHOD, AND COMPUTER READABLE MEDIUM

(75) Inventor: Yasuhiro Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 483 days.

(21) Appl. No.: 12/209,754

(22) Filed: Sep. 12, 2008

(65) Prior Publication Data
US 2009/0234843 A1    Sep. 17, 2009

(30) Foreign Application Priority Data

Mar. 11, 2008 (JP) ................... 2008-060788

(51) Int. Cl.
*G06F 7/00* (2006.01)
(52) U.S. Cl. ........ 707/705; 707/724; 707/726; 707/728; 707/729; 707/730; 707/737; 707/749; 707/802; 707/821; 715/200; 715/243; 715/244; 715/248; 715/253
(58) Field of Classification Search .......... 707/705, 707/724, 726, 728, 729, 730, 737, 749, 802, 707/821; 715/200, 243, 244, 246, 248, 253
See application file for complete search history.

(56) References Cited

U.S. PATENT DOCUMENTS

| | | | | | |
|---|---|---|---|---|---|
| 5,790,853 | A | * | 8/1998 | Nomura et al. | 718/104 |
| 7,860,867 | B2 | * | 12/2010 | Kan et al. | 707/739 |
| 2005/0273466 | A1 | * | 12/2005 | Yoon | 707/100 |

FOREIGN PATENT DOCUMENTS

| | | |
|---|---|---|
| JP | A-2000-67006 | 3/2000 |
| JP | A-2000-76367 | 3/2000 |
| JP | A-2005-10931 | 1/2005 |
| JP | A-2005-332080 | 12/2005 |
| JP | A-2006-350659 | 12/2006 |
| JP | A-2007-133516 | 5/2007 |

OTHER PUBLICATIONS

Hayashi, K., "Activity Awareness: Spreading Collaboration Space among Individual Activities," *Transactions of Information Processing Society of Japan*, Nov. 15, 1999, pp. 3977-3987, vol. 40, No. 11 (with English abstract).
Japanese Office Action issued in Japanese Patent Application No. 2008-060788 on Jan. 26, 2010 (with translation).

* cited by examiner

*Primary Examiner* — Etienne Leroux
*Assistant Examiner* — Cindy Nguyen
(74) *Attorney, Agent, or Firm* — Oliff & Berridge, PLC

(57) ABSTRACT

A relative document representing system includes: a first storage; a receiving unit; a specifying unit; a calculating unit; and a representing unit.

8 Claims, 21 Drawing Sheets

FIG. 8

| TARGET DOCUMENT | WORK SPACE ID | PERIPHERAL DOCUMENT | DISTANCE |
|---|---|---|---|
| A | 1 | B | 3 |
| | | C | 1 |
| | | D | 3 |
| | 2 | B | 1 |
| | | C | 3 |
| | | F | 2 |
| | | G | 1 |
| | 3 | C | 2 |
| | | E | 2 |
| | | F | 1 |
| | ⋮ | ⋮ | ⋮ |
| B | ⋮ | ⋮ | ⋮ |
| ⋮ | ⋮ | ⋮ | ⋮ |

FIG. 9

| DISTANCE | RELEVANCY DEGREE |
|---|---|
| 1 | 3 |
| 2 | 2 |
| 3 | 1 |
| 4 | 0 |

FIG. 11

| DOCUMENT ID | DISTANCE |
|---|---|
| B | 3 |
| C | 1 |
| D | 3 |

FIG. 13

| DOCUMENT ID | RELEVANCY DEGREE TOTALIZED VALUE |
|---|---|
| B | 10 |
| C | 11 |
| D | 2 |
| E | 4 |
| F | 5 |
| G | 4 |

FIG. 17

| USER WHO HAS DESIGNATED TARGET DOCUMENT \ USERS CORRESPONDING TO RESPECTIVE WORK SPACES | HANAKO SUZUKI | JIRO SATO | ICHIRO TANAKA | ... |
|---|---|---|---|---|
| HANAKO SUZUKI | 5 | 3 | 1 | ... |
| JIRO SATO | 3 | 5 | 2 | ... |
| ICHIRO TANAKA | 1 | 2 | 5 | ... |
| ... | ... | ... | ... | ... |

*FIG. 19*

| WORK SPACE ID | ALIGNMENT FLAG |
|---|---|
| 00101 | 1 |
| 00102 | 0 |
| 00103 | 0 |
| ⋮ | ⋮ |

RELATIVE DOCUMENT REPRESENTING SYSTEM, RELATIVE DOCUMENT REPRESENTING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-060788 filed Mar. 11, 2008.

BACKGROUND

1. Technical Field

The present invention is related to a relative document representing system, a relative document reproducing method, and a computer readable medium.

2. Related Art

Conventionally, various sorts of technical ideas have been proposed as systems for retrieving electronic documents which are related to a certain electronic document and for representing the retrieved electronic documents. Also, other systems are known in this technical field, which provide such representations that relevancy degrees among electronic documents are expressed as distances on display screens.

SUMMARY

According to an aspect of the present invention, a relative document representing system includes: a first storage that stores an arranging position of each of a plurality of electronic documents arranged in each of a plurality of workspaces; a receiving unit that refers to information stored in the storage with respect to one workspace selected from the workspaces so as to produce display information in which each of the electronic documents within the one workspace is arranged at an arranging position corresponding thereto, provide the produced display information to a user, and receive a designation of a target electronic document from the user on a display screen formed based on the provided display information; a specifying unit that refers to the information stored in the storage so as to specify as an interest workspace, such a workspace where an electronic document regarded as an identical electronic document to the target electronic document has been arranged, the designation of which has been received by the receiving unit, among workspaces other than the workspace corresponding to the display information provided by the receiving unit; a calculating unit that calculates relevancy degrees of each of the electronic documents with respect to the target electronic document within the interest workspace based on an arranging position of each of the electronic documents within the interest workspace specified by the specifying unit and an arranging position of an electronic document which is regarded as an identical electronic document to the target electronic document within the interest workspace; and a representing unit that represents information indicating an electronic document related to the target electronic document among each of the electronic documents based on the relevancy degrees of each of the electronic documents calculated by the calculating unit with respect to the target electronic document.

BRIEF DESCRIPTION OF THE DRAWINGS

Exemplary embodiment of the present invention will be described in detail based on the following figures, wherein:

FIG. 8 is a diagram for representing an example as to data contents of a relative information managing DB;

FIG. 9 is a diagram for showing an example as to conversion information;

Figure 11:
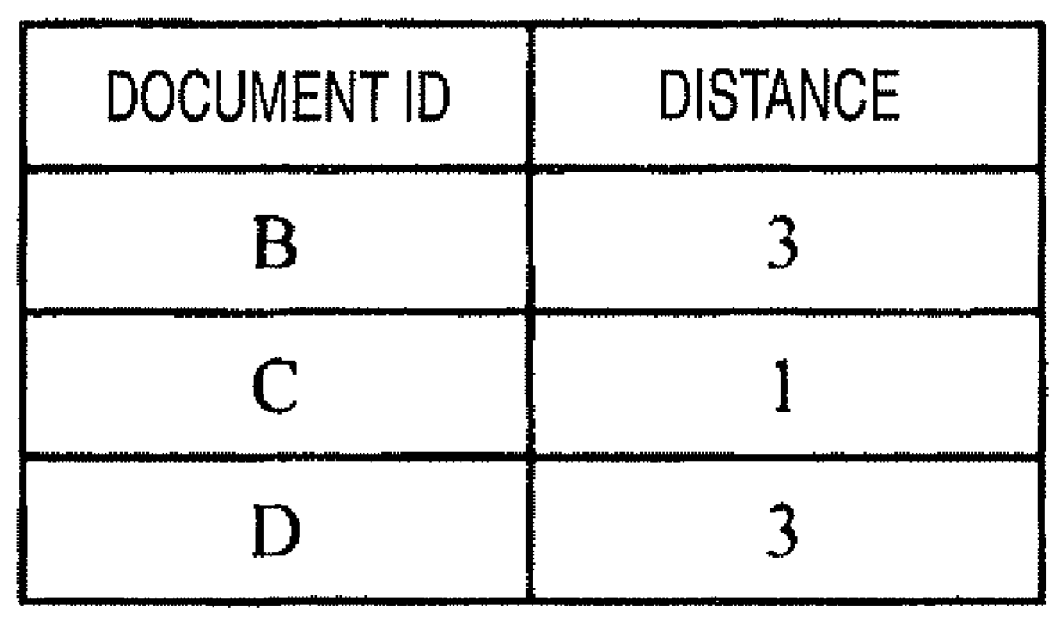

FIG. 11 is a diagram for showing an example as to information of peripheral documents with respect to an electronic document designated on a workspace;

FIG. 13 indicates an example as to data contents of a totalization table;

FIG. 17 is a diagram for showing an example as to a user relation table employed in a second modification;

FIG. 19 is a diagram for showing an example as to alignment flag information employed in a third modification;

DETAILED DESCRIPTION

Figure 1:
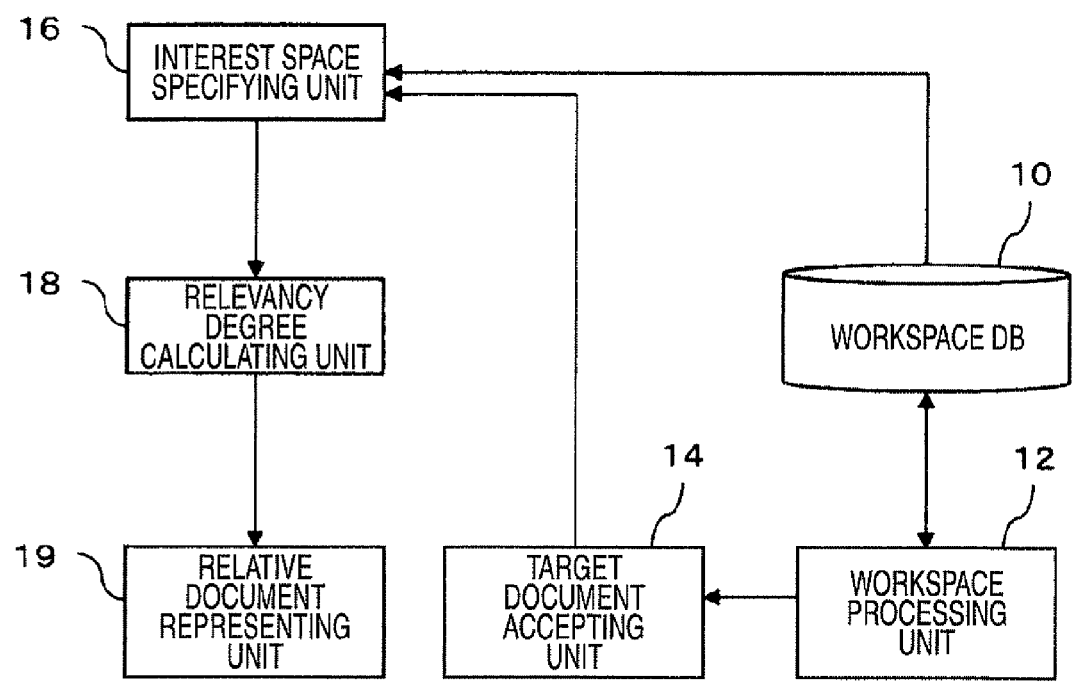
FIG. 1 is a diagram for showing an example of a system arrangement according to an embodiment mode of the present invention.

Referring now to FIG. 1, a description is made of an example of a document managing system according to an embodiment mode of the present invention. This document managing system provides a virtual space called as a workspace with respect to a user. Typically speaking, a workspace is a two-dimensional space, but is not limited only to this two dimensional space. The user arranges one piece, or more pieces of electronic documents with respect to this virtual space.

In a concept as to an "electronic document" in the present embodiment mode, document data, spreadsheet data, drawing data, image data, voice data, multimedia data, and the like are included. Furthermore, a program is also included in the concept of the above-described "electronic document." Also, reference data (for example, so-called "short cut") which designate the above-described data and programs are included in the above-described "electronic document."

With respect to electronic documents arranged in a workspace, positional coordinates within this workspace are defined in correspondence with these electronic documents. The electronic documents are displayed as symbol images indicative of these electronic documents within the workspace. The symbol images are, for instance, icons, size-reduced images of the relevant electronic documents, or the like. The symbol images of the electronic documents may alternatively contain identification information such as file names of these electronic documents. For instance, a workspace may be grasped as one sort of a (either substantial or virtual) directory, or a folder, which contains information related to positional coordinates of respective electronic documents. For instance, in such a case that a workspace is a two-dimensional space, the positional coordinates of the electronic documents may be expressed based upon an X-Y coordinate system in which pixels on the screen of the workspace are employed as a unit.

The document managing system provides one piece, or more pieces of workspaces with respect to each of users. A user can arrange electronic documents at desirable positional coordinates within the own workspace. A user can form a workspace with respect to each of user-defined divisions such as, for example, every business, or every time period, and then, the user can store an electronic document related to the relevant division with respect to this formed workspace.

Figure 2:
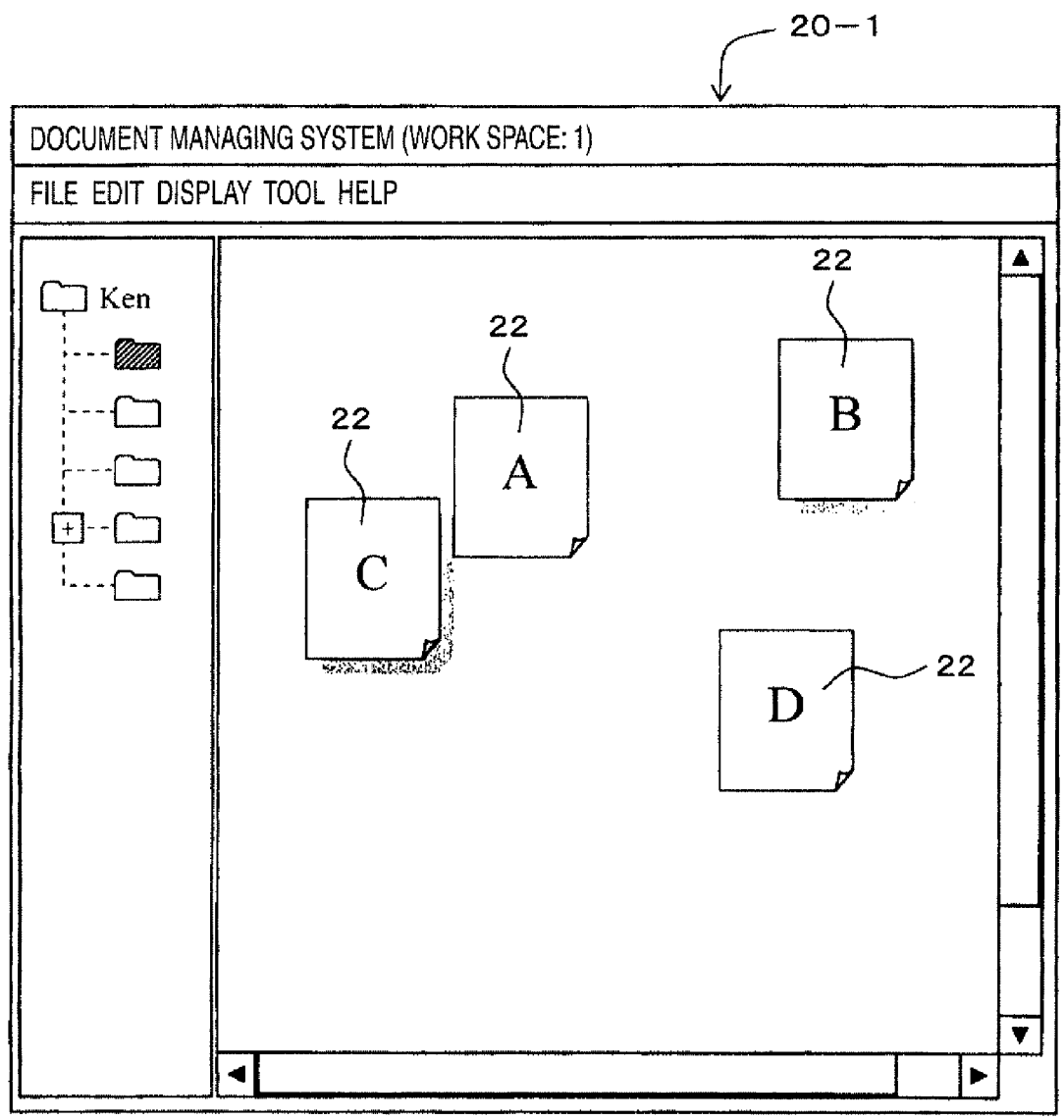
FIG. 2 is a diagram for showing one example of a workspace screen.
Figure 3:
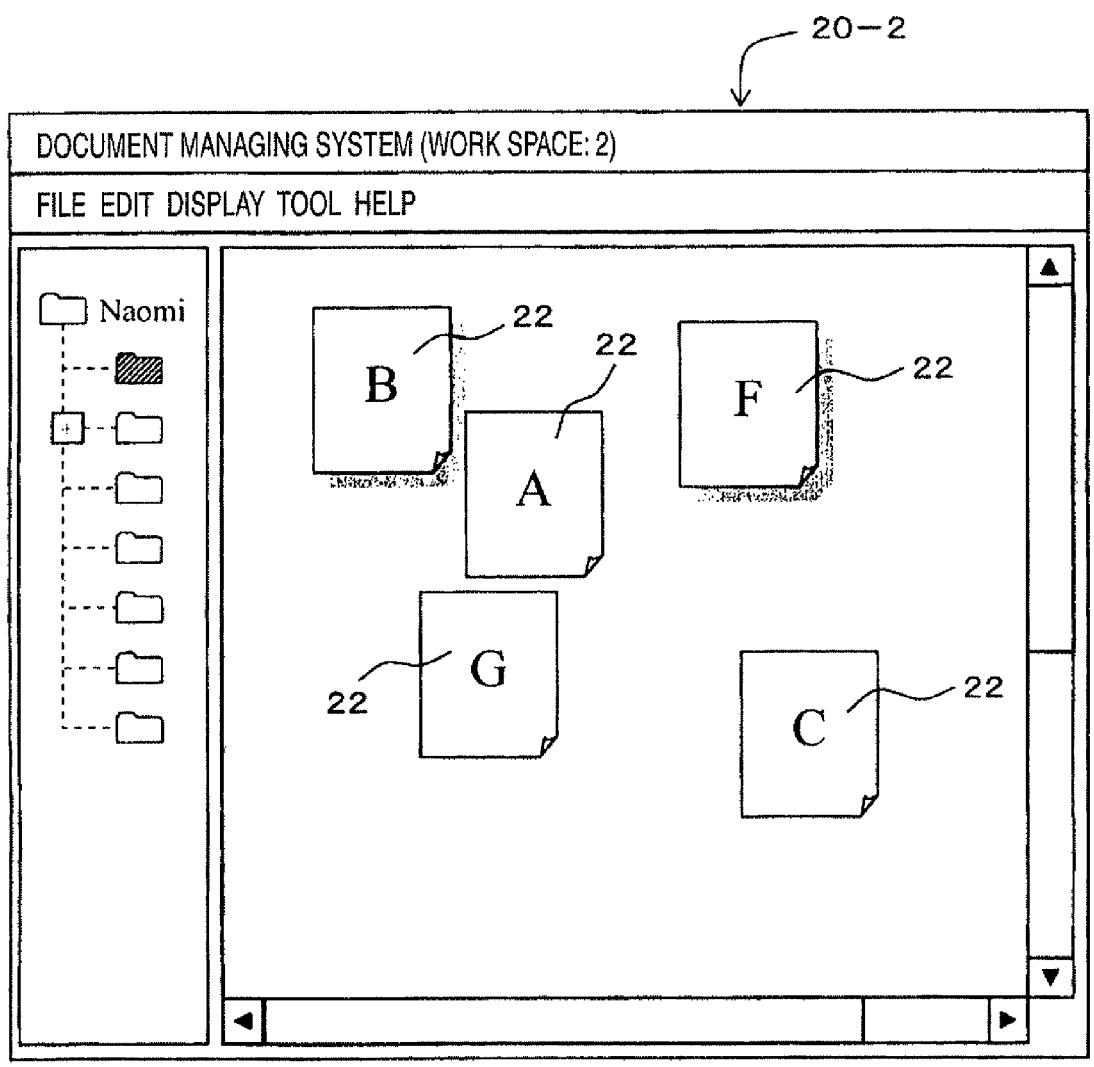
FIG. 3 is a diagram for showing another example of the workspace screen.

The document managing system produces information about a screen indicative of workspaces, and provides the formed information to a user terminal. An example as to the screens of the workspaces is indicated in FIG. 2 and FIG. 3. FIG. 2 and FIG. 3 show workspace screens 20-1 and 20-2 with respect to different users, respectively. As exemplified in these drawings, symbol images 22 of the respective electronic documents contained in the relevant workspaces are arranged at positional coordinates on the workspace screens 20-1 and 20-2, while the positional coordinates correspond to the relevant electronic documents. A desktop screen provided by an operating system (OS) corresponds to an example of the workspace screen. While a workspace screen is constructed based upon a graphical user interface (GUI) technique, a user can operate electronic documents displayed on the workspace screen by employing a pointing device such as a mouse. For example, a symbol image of an electronic document on the workspace screen can be moved by performing a so-called "Drag & Drop" operation. In responses to the above-described symbol image movement, the positional coordinates of the electronic documents are changed. Also, a symbol image of an electronic document is selected by employing an input apparatus such as a pointing device, and then, an opening operation and other operations may be performed with respect to a file of this selected electronic document.

In the present embodiment mode, based upon the information of the workspace group saved in such a document managing system, such an electronic document related to the electronic document designated by the user is acquired. In the present embodiment mode, in order to acquire the relevant electronic document, when a designation of an electronic document (will be referred to as "target document" hereinafter) on a workspace is received from a user, such a workspace (will be referred to as "interest space" hereinafter) having an electronic document (will be referred to as "interest document" hereinafter) identical to the designated electronic document is specified within workspaces other than the first-mentioned workspace. Then, based upon arranging positions of the respective electronic documents and an arranging position of the interest document within this interest space, relevancy degrees of the respective electronic documents with respect to the target document are calculated; and such an electronic document related to the target document is determined based upon the calculated relevancy degrees.

In one example, based upon the arranging positions of the respective electronic documents and the arranging position of the interest document within the interest space, a calculation is made of distances between each of these electronic documents and the interest document. It is so determined that the shorter the calculated distance becomes, the higher the relevancy degrees among these electronic documents become. Conversions from distances to relevancy degrees are carried out based upon conversion information provided in the document managing system. For example, when it is so determined that the stronger the relative characteristics among electronic documents become, the higher the values of the relevancy degrees become, the conversion information is defined in such a manner that the shorter the distances become, the higher the relevancy degrees become. In the case that a plurality of interest spaces are present, such an electronic document related to the target document is determined based upon a result of totalizing relevancy degrees. Namely, relevancy degrees of respective electronic documents with respect to the target document, which have been calculated as to the plural interest spaces, are totalized with respect to each of the respective electronic documents.

The document managing system exemplified in FIG. 1 is equipped with a workspace DB (database) 10, a workspace processing unit 12, a target document receiving unit 14, an interest space specifying unit 16, a relevancy degree calculating unit 18, and a relative document representing unit 19, as function modules.

Figure 4:
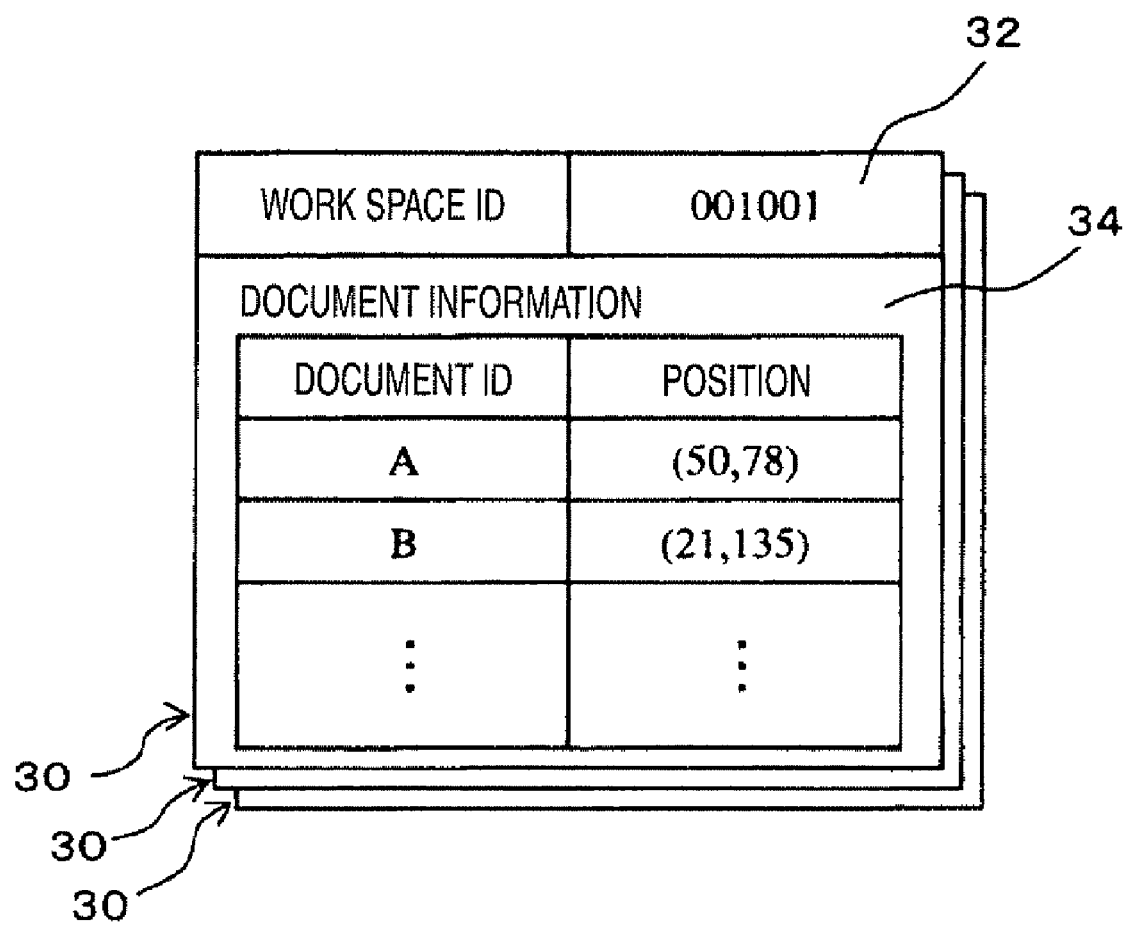
FIG. 4 is a diagram for representing an example of data contents of a workspace DB.

The workspace DB 10 is such a database into which information used to manage workspaces of respective users has been stored. FIG. 4 indicates an example of data contents of the above-described workspace DB 10. In this example, a workspace record 30 corresponding to a single workspace contains a workspace ID 32 and document information 34. The workspace ID corresponds to identification information which may exclusively specify the relevant workspace. The document information 34 contains "document IDs" and "positions" as to respective electronic documents stored in the relevant workspace. A "document ID" corresponds to identification information of the relevant electronic document. A "position" corresponds to positional coordinates of the relevant electronic document within the relevant workspace. This positional coordinate is such a coordinate of a reference point (for example, upper left corner point, or a gravity center point of image etc.) of a symbol image for the relevant electronic document within a coordinate system of this workspace. Alternatively, other information (for instance, information indicative of user, which corresponds to relevant workspace) may be contained in the workspace information 30. In the workspace DB 10, such workspace records 30 have been stored one by one every workspace.

It should be noted that substantial data of electronic documents have been stored in a document DB (not shown) in correspondence with the document IDs.

The workspace processing unit 12 executes a process operation related to a workspace in response to an operation of a user. This process operation contains, for example, a process operation for providing a screen of the workspace of this user, and various sorts of process operations with respect to an electronic document displayed on this screen. In the various sorts of process operations with respect to the electronic document, the below-mentioned process operations are included: That is, the electronic document is opened, moved, deleted, and copied in response to an instruction issued from the user.

The target document receiving unit 14 receives a designation of a target document from the user. Namely, the above-described target document implies such an electronic document which constitutes a target for extracting a relevant document. In one example, the workspace processing unit 12 may merely cause the user to designate the target document on the workspace screen provided to this user.

The interest space specifying unit 16 specifies such a workspace (namely, interest space) from the workspaces registered in the workspace DB 10, while this interest space has contained an electronic document (namely, interest electronic document) which is identical to the target document received by the target document receiving unit 14. In one example, an electronic document having the same document ID as that of the target document is regarded as the interest electronic document, and then, the interest space specifying unit 16 specifies such a workspace as the interest space, which contains the above-described interest electronic document.

The relevancy degree calculating unit 18 refers to the workspace record 30 of the interest space held by the workspace DB 10, especially refers to positional coordinates of the respective electronic documents so as to calculate distances between the interest electronic document and other respective electronic documents within the interest space. Although the relevancy degree calculating unit 18 may directly employ the calculated distances as the relevancy degrees, the relevancy degree calculating unit 18 may alternatively convert a distance into a relevancy degree based upon such a conversion information as a predetermined conversion function, or a conversion table instead of the calculated distance.

Also, in such a case that there are a plurality of interest spaces specified by the interest space specifying unit 16, the relevancy degree calculating unit 12 may alternatively totalize calculated relevancy degrees over these plural interest spaces every electronic document. In other words, in such a case that a representation of a relevant document with respect to a target document "A" is requested by the user, with respect to each of the interest spaces, relevancy degrees between respective electronic documents "X" (except for interest document identical to target document) and the target document "A" within the relevant interest space are calculated, the relevancy degree calculating unit 18 totalizes these relevancy degrees over these plural interest spaces every same electronic document "X." It should also be noted that when the relevant degrees are totalized, such an electronic document "X" (namely, electronic document separated extremely far from interest document) whose distance measured from the interest document exceeds a predetermined threshold value may be alternatively excluded from target documents whose relevancy degrees should be totalized.

In the totalizing operation, for example, the relevancy degrees of the electronic documents "X" with respect to the target documents "A", which have been calculated in the respective interest spaces may be merely added to each other over all of these interest spaces, and then, the added result may be employed as a totalized value. Also, as another example, this added result may be alternatively normalized based upon the number of interest spaces so as to employ the normalized value as the totalized value. The normalization may be realized by, for instance, dividing the added result by a total number of these interest spaces.

The relative document representing unit 19 represents a relative document with respect to the user based upon the relevancy degrees of the respective electronic documents with respect to the target document, which have been calculated by the relevancy degree calculating unit 18. In such a case that the relevancy degree calculating unit 18 calculates a totalized value of relevancy degrees over a plurality of interest spaces, the relative document representing unit 19 may determine a relevant document based upon this totalized value and may represent the determined relevant document to the user. The representation of the relevant document may be carried out in a similar manner to a representation of a retrieved result in a conventional general-purpose retrieve tool. For example, the relative document representing unit 19 may alternatively provide an extracted result screen to the user, on which links to an electronic document have been arrayed in the order of either higher relevancy degrees or larger totalized values (namely, relation of electronic document with respect to target document is high).

Alternatively, the electronic documents which are displayed on the extracted result screen may be limited only to such electronic documents having relative intensity higher than, or equal to a predetermined degree (namely, either relevancy degree or totalized value becomes larger than, or equal to predetermined threshold value). Also, the relative document representing unit 19 may alternatively specify such an electronic document having the highest relation with respect to the target document based upon the relevancy degrees, or the totalized value, and then, may alternatively provide this specified electronic document as an extracted result. Furthermore, while several stages may be conducted in either relevancy degrees or totalized values in such a manner that "relationship is strong", "although relationship is not so strong, there is certain possibility that relationship is present", the respective electronic documents may be alternatively displayed on the extracted result screen in a distinguishable manner with respect to these stages. In this alternative case, the distinguishable display manner may be realized by employing the below-mentioned methods. That is, for example, while a column every stage is divided into plural columns, the respective electronic documents may be alternatively displayed on these divided columns, or the electronic documents may be displayed in different display modes for the respective stages. Thus, the user may select a link to a desirable electronic document within such an extracted result screen and then, may instruct various sorts of operations, for example, may open this desirable electronic document.

Figure 5:
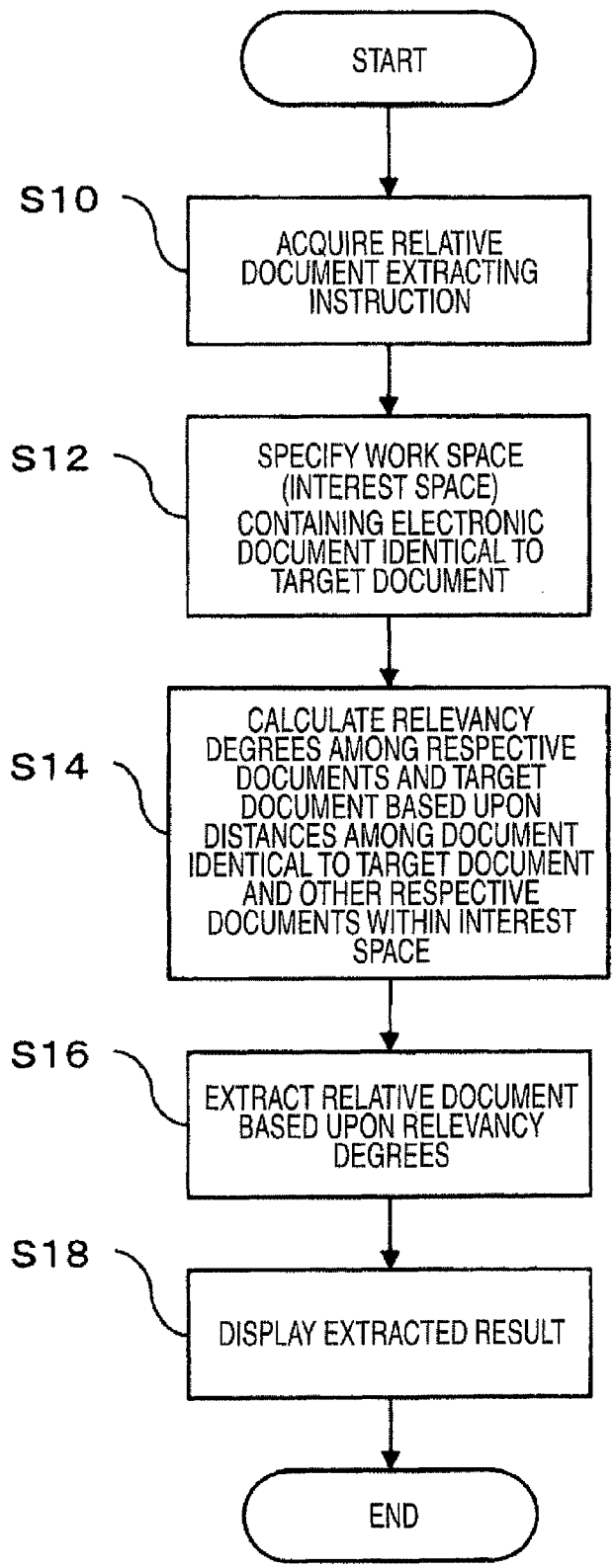
FIG. 5 is a flow chart for representing an example as to a process sequence of extracting a relative document in the system of FIG. 1.

Next, referring to FIG. 5, a description is made of one example as to a processing flow operation for representing a relevant document in the document managing system of FIG. 1. In this process operation, firstly, the target document receiving unit 14 receives a designation of a target document from a terminal of a user (step S10). Subsequently, the interest space specifying unit 16 retrieves a workspace (interest space) from the workspace DB 10, which contains such an electronic document (interest document) identical to the above-described target document (step S12). Based upon distances between the interest document and other respective electronic documents in the interest space, the relevancy degree calculating unit 18 calculates relevancy degrees of the respective electronic documents with respect to the target document respectively (step S14). At this time, in such a case that plural pieces of the interest spaces are specified, the relevancy degree calculating unit 18 may alternatively totalize relevancy degrees every electronic document over the plural interest spaces. The relative document representing unit 19 produces a screen indicative of an extracted result of the relative documents based upon the calculated relevancy degrees (otherwise, totalized result thereof) of the respective electronic documents, and provides the produced screen to the terminal of the user, which corresponds to the request source (steps S16 and S18). In the example indicated in FIG. 5, the electronic documents having the relative intensity higher than, or equal to a predetermined degree have been extracted as the relative documents (step S16), and then, the extracted result has been represented to the user (step S48).

It should also be noted that the above-described process sequence of FIG. 5 merely constitutes one exemplification. Accordingly, instead of this process sequence, for instance, while the relevancy degrees among the electronic documents within each of the workspaces have been previously calculated, such a database may be alternatively formed into which the calculated relevant degrees among the electronic documents within each of the workspaces have been stored. In this alternative case, when an instruction for extracting a relevant document is received from the user, for instance, the relevant document representing unit 19 may merely retrieve the relevant degrees between the interest document and other respective electronic documents within the interest space specified by the interest space specifying unit 16 from the above-described database. This database may be updated at predetermined timing, for instance, in a periodic manner, or at such a timing when the user operates an electronic document within a workspace. When this updating process operation is carried out, the relevancy degree calculating unit 18 may merely calculate relevancy degrees among the respective electronic documents.

Next, a description is made of other exemplifications with reference to FIG. 6 to FIG. 15. A document managing server 100 exemplified in FIG. 6 has been connected via a network 300 such as the Internet, or a LAN (Local Area Network) to a user PC (Personal Computer) 200. The user operates the own user PC 200 so as to access the document managing server 100, and also to receive a service related to a workspace.

Figure 7:
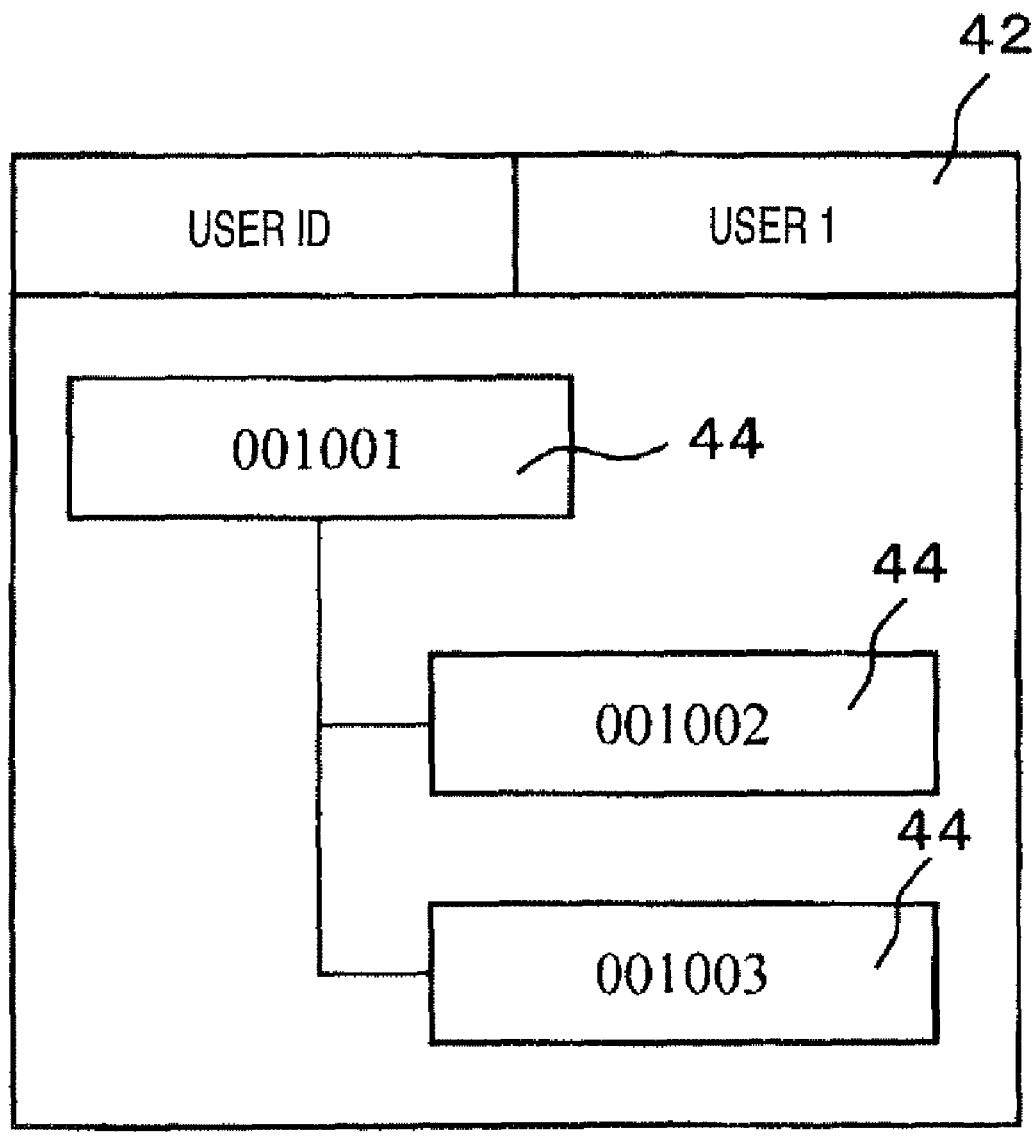
FIG. 7 is a diagram for conceptionally indicating an example as to information of a correspondence relation between users and workspaces.

Similar to the workspace DB 10 of the example of FIG. 1, a workspace DB 110 contained in the document managing server 100 has stored thereinto workspace records which define the respective workspaces. In addition, such an information indicative of correspondence relationship between the users and the workspaces allocated to the users may be alternatively registered in the workspace DB 110. FIG. 7 conceptionally shows one example of this information related to the above-described correspondence relationship. In this case, the information about the correspondence relationship has contained an ID (identification information) 42 for each of the users, and another ID 44 for one piece, or more pieces of workspaces allocated to each of these users. In this case, a concept of the above-described "user" covers not only one person, but also a user group which is constructed of a plurality of persons. A user who belongs to a certain user group can access a workspace which corresponds to this user group. Also, in the exemplification of FIG. 7, the workspaces allocated to the user have formed a tree structure. In accordance with this exemplification, the respective users can construct tree structures of workspaces in response to a classification way of the own user.

The workspace processing unit 112 executes a similar process operation to that of the workspace processing unit 12 employed in the example of FIG. 1. Also, a user authenticating unit 114 performs an authenticating process operation for a user who has sent an access request to a workspace via the user PC 200. In order to perform the authenticating process operation of the user, the existing technical ideas may be employed, for instance, password authentication, biological authentication, authentication executed with employment of digital certification, and the like may be employed. The user authenticating unit 114 refers to a user information DB 116 when the user authenticating unit 114 performs this user authenticating process operation. In the user information DB 116, authentication information of the respective users have been registered, for instance, paired data constructed of user IDs and passwords, biological information (features of finger prints etc.), or digital certification have been registered. It should also be noted that attribute information of users other than the authentication information may be alternatively registered in the user information DB 116. As to such attribute information, for instance, there are provided official positions of users in organizations such as enterprises; groups to which users belong; and the like. Only when user authentication can succeed by the user authenticating unit 114, a user is allowed to access a workspace.

In a relative information managing DB 120, with respect to each of electronic documents, either distances or relevancy degrees between the own electronic document and other electronic documents within each of workspaces to which the own electronic document belongs are registered. FIG. 8 represents one example as to data contents of the relative information managing DB 120. In this example, with respect to each of electronic documents (electronic document being indicated as "target document" in this drawing), one record corresponding to a document ID of this target document has been registered. Also, in a record of one target document, a record of such a workspace in which this target document is contained has been registered in correspondence with an ID of the above-described workspace. In a record of a workspace, entries are contained, while the entries cover other electronic documents (other electronic documents being indicated as "peripheral documents" in this drawing) which are present in this workspace. In an entry of one peripheral document, an ID of this peripheral document and a distance measured from the peripheral document up to a target document have been registered. In FIG. 8, although values of distances have been waded up while 1 is defined as a unit, this wadding method may merely constitute one exemplification. Also, in FIG. 8, although only such electronic documents have been listed up as "peripheral documents" whose distances from the target document are shorter than a certain threshold value (for example, 5), namely these electronic documents are located near the target document, this listing method may also merely constitute one exemplification. When the document managing server 100 of FIG. 6 receives an instruction for extracting a relevant document from the user, the document managing server 100 refers to the above-described relevant information managing DB 120 so as to extract the relevant document thereof.

A relative information updating unit 118 executes a process operation for updating the relative information managing DB 120 at predetermined updating timing such as at timing when the user operates an electronic document, or in a periodic manner. In this updating process operation, the relative information updating unit 118 calculates distances among the respective electronic documents in the respective workspaces based upon the information stored in the workspace DB 110 at the updating timing, and then, updates the information related to the peripheral documents and the distances stored in the relative information managing DB 120 based upon the calculated results. It should also be noted that this updating process operation will be discussed later in detail.

Similar to the target document receiving unit 14 in the exemplification of FIG. 1, a target document receiving unit 122 receives a designation of a target document corresponding to a target of extracting a relevant document from the user PC 200. A target record acquiring unit 124 acquires a record of the target document received by the target document receiving unit 122 from the relative information managing DB 120. In order to avoid cumbersome explanations in the below-mentioned description, it is so assumed that both an electronic document which has been designated via the target document receiving unit 122 on a certain workspace, and furthermore, such an electronic document which is present on another workspace and is identical to the first-mentioned electronic document will be commonly referred to as "target documents."

Figure 9:
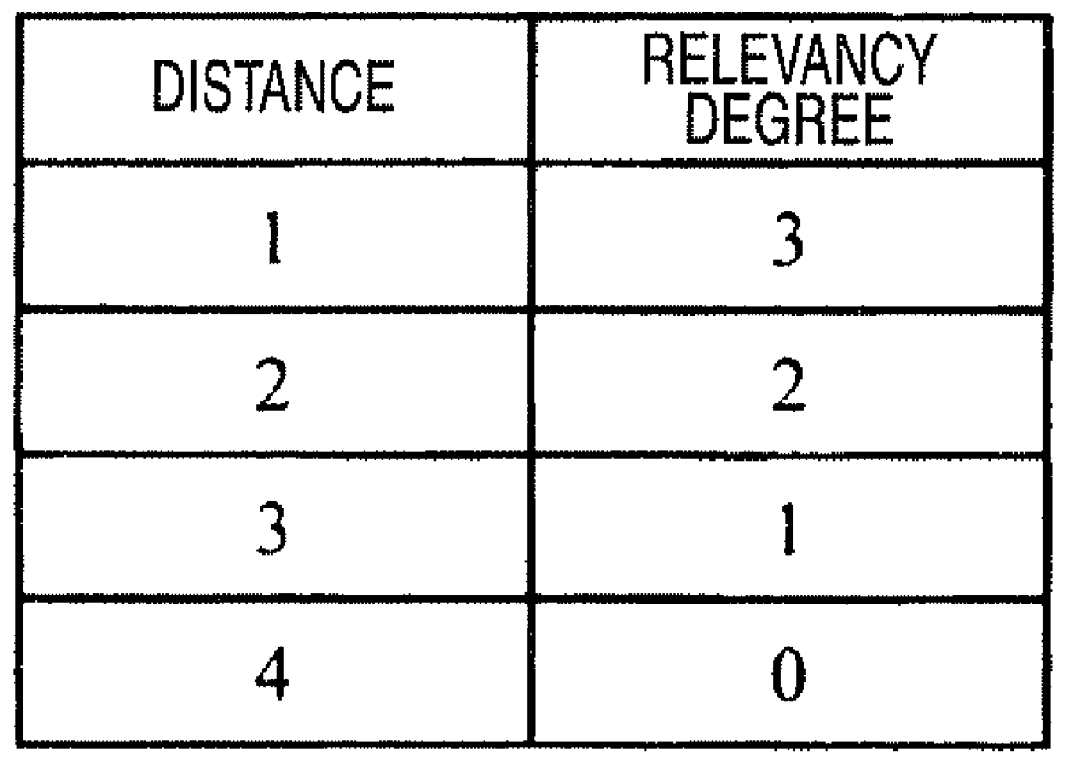

A relevancy degree totaling unit 126 converts distances of respective peripheral documents contained in the record of the target document acquired by the target record acquiring unit 124 into relevancy degrees based upon conversion information 128, and then, totalizes relevancy degrees of the converted result every peripheral document. The conversion information 128 may be realized by such a table type as exemplified in FIG. 9, or by a function for a conversion purpose. In the example of FIG. 9, values of the relevancy degrees corresponding to distances have been registered every distance.

Similar to the relevant document representing unit 19 provided in the example of FIG. 1, a relevant document providing unit 130 produces screen information about the extracted result of the relevant document based upon the totalized result of the relevant degree totalizing unit 126, and then, returns the produced screen information to the user PC 200 of the request source.

Figure 6:
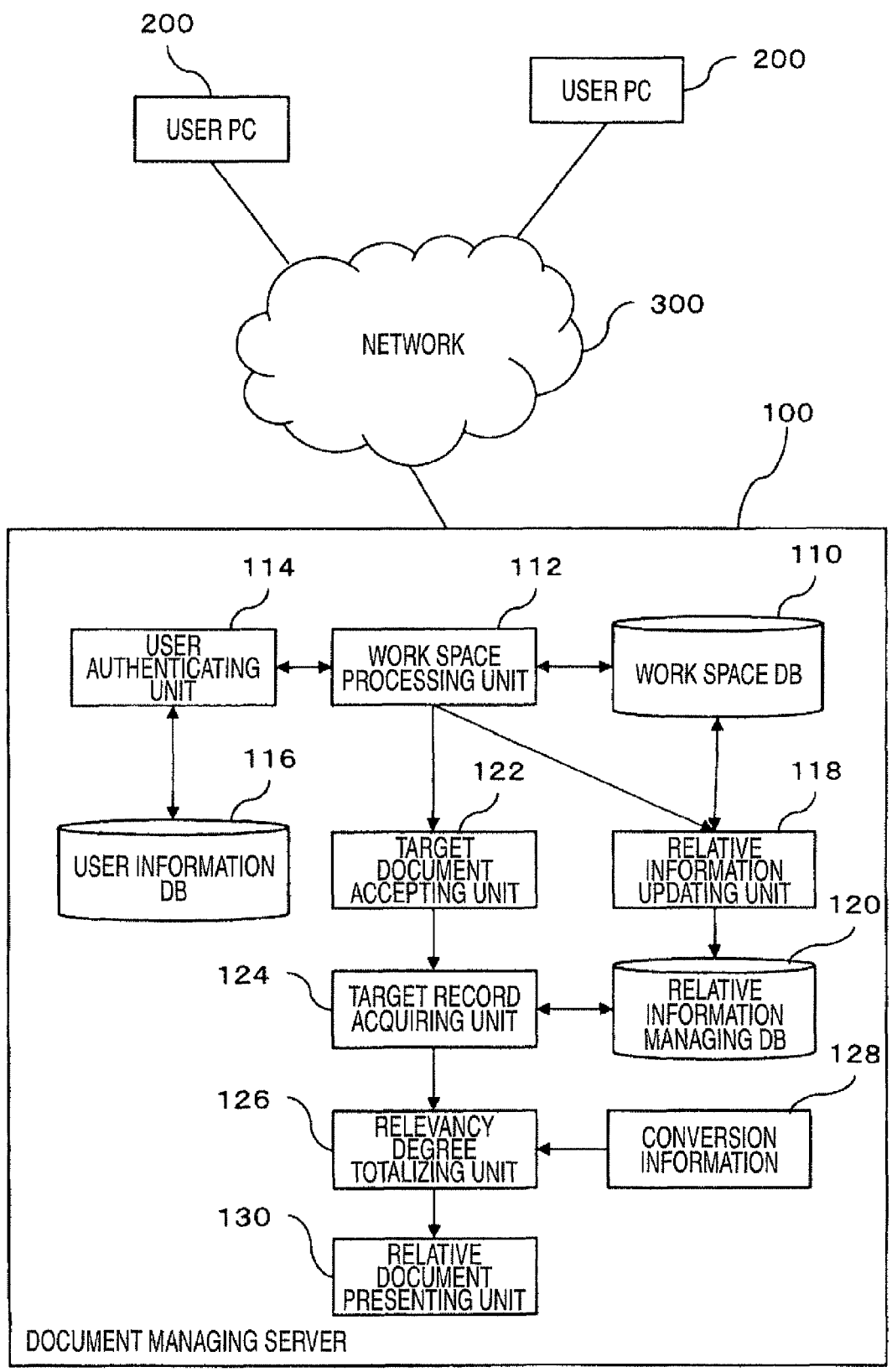
FIG. 6 is a diagram for showing another example as to the system arrangement of the embodiment mode.
Figure 10:
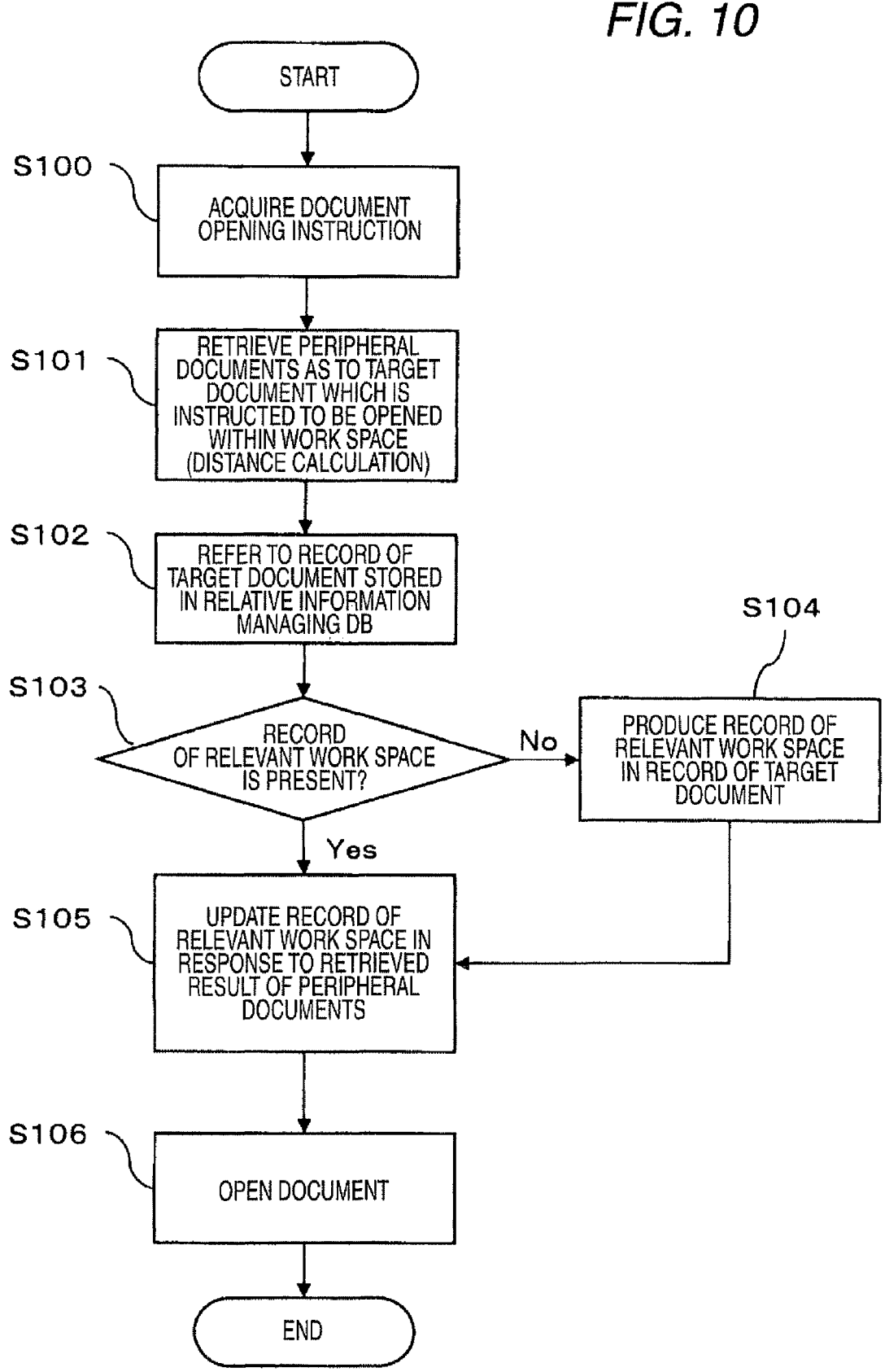
FIG. 10 is a flow chart for describing an example as to a process sequence of a relative information updating unit.

Next, referring to FIG. 10, a description is made of an example as to the process sequence of the relative information updating unit 118 in the document managing system of FIG. 6. In this sequence, in conjunction with an opening instruction of an electronic document on the workspace screen (refer to FIG. 2 and FIG. 3), the relative information updating unit 118 updates such a record as to the relevant workspace among the records stored in the relevant information managing DB 120 in which the open-instructed electronic document constitutes the target document.

This process sequence is commenced when the workspace processing unit 112 receives an instruction for opening an electronic document within a certain workspace from the user PC 200 (step S100). At this time, the relative information updating unit 18 calculates distances between an electronic document (will be referred to as "target document" hereinafter) which constitutes the target of the opening instruction and other respective electronic documents in this workspace, and specifies such a peripheral document whose distance is shorter than, equal to a predetermined threshold value (step S101). The calculation of these distances is carried out based upon positional coordinates of the respective electronic documents in records of the relevant workspace within the workspace DB 110. The threshold values of the distances required for determining the peripheral document have been previously set in the document managing server 100.

Also, the relative information updating unit 118 refers to the records of the target documents within the relative information managing DB 120 (step S102) so as to check whether or not such a record of this workspace is present (step S103). When the record of the relevant workspace is not present within the record of the target document, then such a record of this workspace is produced (step S104), and the process sequence is advanced to a step S105. At the time when the record is produced, an entry of the peripheral document is not contained in the record of this workspace.

In the step S105, the relative information updating unit 18 updates the record of the relevant workspace within the records of the target documents stored in the relative information managing DB 120 based upon the information as to the respective peripheral documents and the distances defined in the step S101. After this record has been updated, the workspace processing unit 112 opens the target document (step S106).

For example, in such a case that the user instructs to open the target document "A" on the workspace 20-1 exemplified in FIG. 2, electronic documents "B", "C", "D" are specified as the peripheral documents for this target document "A." Distances between the respective peripheral documents "B", "C", "D" and the target document "A" are calculated as "3", "1", "3", respectively. Based upon the information about distances between the peripheral documents "B", "C", "D" and the target document "A", the relative information updating unit 118 updates the distances of the respective peripheral documents in the record of the workspace 20-1 within the record of the target document "A" among the data contents stored in the relative information managing DB 120 exemplified in FIG. 8.

In the example of FIG. 10, only the record with respect to the electronic document corresponding to the opening instruction target has been updated. Alternatively, records as to other electronic documents present in the workspace which is instructed to be opened may be similarly updated.

Also, in the example of FIG. 10, the record has been updated by employing the opening operation of the electronic document as a trigger. The present invention is not limited only to the above-described example, namely, other operations with respect to the electronic document may be alternatively employed as the triggers so as to update the record.

Next, referring to FIG. 12n and FIG. 13, a description is made of one example as to a process sequence in which the document managing server 100 extracts a relevant document.

In this sequence, if a user who operates the user PC 200 selects a target document on a workspace screen which is provided by the workspace processing unit 112 and instructs to extract a relevant document as to this target document, then the target document receiving unit 122 receives this extracting instruction (step S200). The target record acquiring unit 124 refers to the relevant information managing DB 1200 (step S201) so as to determine whether or not such a record is present which corresponds to the target document received by the target document receiving unit 122 (step S202). In this step, if the record corresponding to the target document is not present, then this situation implies that an electronic document whose distance with respect to this target document is longer than, or equal to a predetermined distance has not been registered in the relevant information managing DB 120. As a result, the relative document representing unit 130 determines that the relevant document is not present (step S209), and returns this extracted result to the user PC 200 (step S208).

When the relative document representing unit 130 determines in the step S202 that the record of the target document is present in the relative information managing DB 120, the target record acquiring unit 124 acquires the record of this target document, and the relevancy degree totalizing unit 126 tries to acquire a peripheral document entry of a head contained in this target record (step S203). If the peripheral document entry (namely, both document ID and distance) can be acquired due to the above-described trying operation ("Yes" in step S204, namely if process operation has not yet been accomplished until last peripheral document entry of record of target document), then this acquired distance is converted into a relevancy degree by utilizing the conversion information 128 (step S205), and a totalized value corresponding to the peripheral document in a totalization table is updated based upon the converted relevancy degree (S206).

In this case, as exemplified in FIG. 13, the totalization table implies such a table that totalized values of relevancy degrees of the respective peripheral documents have been registered in correspondence with document IDs of these respective peripheral documents. in the case that the totalized values are obtained by adding the relative values, in the step S206, the relative values acquired in the step S205 may be added with respect to the totalized values corresponding to the peripheral document. It should also be understood that when such a value is defined as the totalized value of the relevancy degrees, while this value has been obtained by such a manner that an added result has been normalized by a total number of workspaces where the relevant target document is contained, the relevancy degree totalizing unit 126 may perform a totalization until the last peripheral document entry contained in the record of this target document, and thereafter, may merely normalize a finally added result as to the respective peripheral documents obtained by this totalization based upon the total number of the workspaces into which the relevant target document is contained.

Then, the process sequence is returned to the previous step S203 in which an ID and a distance of a next peripheral electronic document are acquired from the record of the target document acquired from the relative information managing DB 120, and then, the process operations subsequent to the step S204 are repeatedly carried out. In the repetition process operations from the steps S203 to S206, it is so understood that the record corresponding to the target document has been derived from the relevant information managing DB 120 (refer to FIG. 8). Since the respective workspaces containing the target document have been contained in this derived record, namely a record of an interest space has been contained in this derived record, the above-described process operation corresponds to a process operation for specifying the interest space.

For instance, while the relative information managing DB 120 has such a data content shown in FIG. 8, in such a case that the target document designated by the user in the step S200 corresponds to the document "A", first of all, the relevancy degree totalizing unit 126 acquires a distance "3" of the peripheral document "B" in the step S203 from a record of a workspace ID "1" contained in the record of the document "A" from a peripheral document entry of a head. Then, in the step S205, the relevancy degree totalizing unit 126 converts this acquired distance "3" into a relevancy degree "1" based upon the table shown in FIG. 9, and, in the step S206, adds the relevancy degree "1" to a totalized value (namely, zero at this stage) of the peripheral document "B" contained in the totalization table. Next, in the step S203, the relevancy degree totalizing unit 126 again acquires a distance "1" of the peripheral document "C" from a second peripheral document entry contained in the record of the workspace ID "1", and converts this acquired distance "1" into a relevancy degree "3" in the step S205, and then, adds this converted relevancy degree "3" to a totalized value of this peripheral document "C" contained in the totalization table in the step S206. The relevancy degree totalizing unit 126 repeatedly executes the above-described process operations until a last peripheral document entry of records of all the workspaces contained in the record of the target document "A."

When the relative value totalizing unit 126 accomplishes the totalizing operations until the last peripheral document entry contained in the record of the target document, a determined result of the step S204 becomes "No." In this case, the relative document representing unit 130 refers to the totalization table so as to extract a relevant document (step S207). For example, in such a case that a final totalized result corresponds to such a totalization table shown in FIG. 13 and the threshold value of the relevancy degree in order to determine as the relative document is equal to 7, both the document "B" and the document "C" are extracted as the relative documents. The relative document representing unit 130 produces a screen which indicates this extracted result, and provides the information of this screen to the user PC 200 (step S208).

Figure 14:
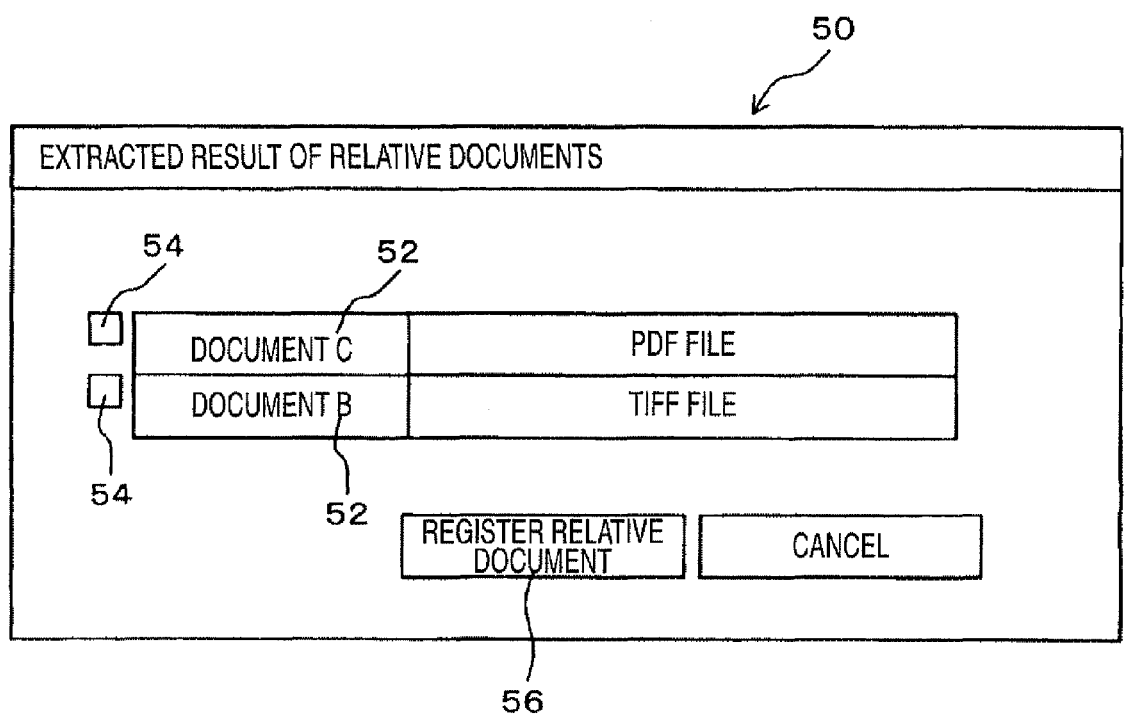
FIG. 14 is a diagram for indicating an example as to a display screen of a relative document extracted result.

FIG. 14 shows a display example as to a screen 50 of the extracted result. In this example, document names 52 as to the documents "B" and "C" extracted as the candidates of the relative documents are represented in a list form. Also, in this example, as the information required in that the user determines the respective relative documents, file formats of the respective relative documents have been displayed, which may merely constitute one example. Alternatively, only document names may be displayed; other attribute information of the relative documents may be displayed; or compressed images of the relative documents may be displayed. Also, alternatively, the user may click the document names 52 of the respective relative documents so as to open these relative documents, so that the user may confirm the contents of the opened relative documents.

Also, in the example of FIG. 14, while a check box 54 has been displayed every relative document, the user can select the check box 54 by operating an input apparatus (pointing device etc.) equipped in the user PC 200. When a relative document register button 56 is depressed by operating the input apparatus such as the pointing device, such a fact that a relative document where the check box 54 is under selection condition is equal to the relative document of this target document is registered into a relative document DB (database) which is not shown. The relative document DB corresponds to such a database into which a relative document clearly designated by the user is registered. The extracted result which is represented by the relative document representing unit 130 corresponds to a relative document which is predicted from a large number of workspaces stored in the workspace DB 110, but does not correspond to such a document which is clearly designated by the user herself as the relative document of the target document. In such a view point that the user herself clearly designates a relative document, such a document represented by the relative document representing unit 130 implies a so-called "candidate" of a relative document. In other words, in the example of FIG. 14, relative document candidates of target documents predicted from the workspace group are represented to the user, and then, the user registers a necessary relative candidate selected from these relative document candidates in the relative document DB as a formal relative document. However, this example of FIG. 14 may merely constitute one example of an application of the extracted result of the relative document represented by the relative document representing unit 130.

Figure 15:
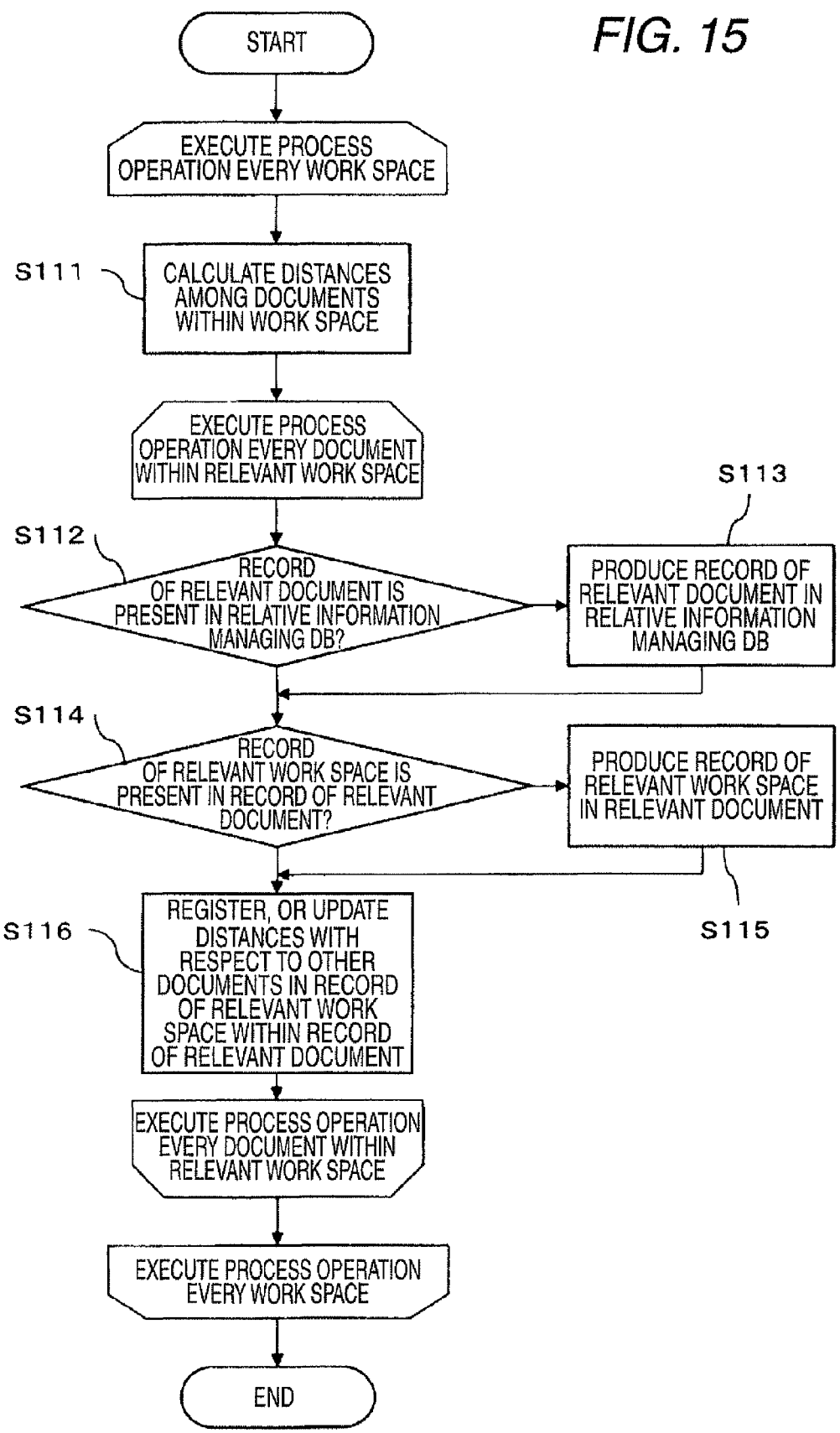
FIG. 15 is a flow chart for describing another example as to the process sequence of the relative information updating unit.

Next, referring to FIG. 15, a description is made of another example as to the updating process operation of the relative information managing DB 120. In the above-described updating process example of FIG. 10, the storage content of the relative information managing DB 120 has been partially updated in response to the opening operation for the electronic document contained in the workspace. In contrast to the above-described updating process, in the sequential process of FIG. 15, the entire storage content of the relative information managing DB 120 is updated in a periodic manner, or every time predetermined updating timing has passed, for example, at such a timing when the manager issues an updating instruction.

In this updating sequence, when the predetermined updating timing becomes effective, in a first step S111, the relative information updating unit 118 derives a record of one workspace registered in the workspace DB 110, and then, calculates distances among respective electronic documents within the derived workspace based upon positional coordinates of the respective electronic documents. Then, the relative information updating unit 118 executes the process operations defined from the step S112 to the step S116 with respect to each of the electronic documents contained in the above-described derived workspace.

In other words, in the step S112, the relative information updating unit 118 checks whether or not such a record that the relevant electronic document constitutes "target document" is present in the relative information managing DB 120, and if such a record is not present, then the relative information updating unit 118 produces this record (at this time, content of this record is empty) in a step S113. Next, in a step S114, the relative information updating unit 118 checks whether or not there is the record of the above-described workspace within the record of the above-described target document, and if such a record is not present, then the relative information updating unit 118 produces this record (at this time, content of this record is empty) in a step S115. Thereafter, the relative information updating unit 118 writes, or overwrites the distances between the above-described target document and other respective electronic documents (peripheral documents), which have been calculated in the above-described step S111, as distance values of the respective electronic documents (peripheral documents) within the record of the relevant workspace in a step S116.

The above-described process operations defined form the step S111 to the step S116 are carried out every workspace contained in the workspace DB 110, so that the storage content of the relative document managing DB 120 is updated.

It should be noted that although the distances of the respective peripheral documents have been registered in the relative information managing DB 120 in the above-explained example, relevancy degrees instead of the above-described distances may be alternatively registered thereinto. In this alternative case, the relevancy degree totalizing unit 126 no longer converts the distances into the relevancy degrees.

Furthermore, instead of converting the distances into the relevancy degrees, alternatively, the relevant document may be extracted in accordance with such a technical idea that the smaller the totalization value of the peripheral documents becomes, the higher the relevancy degrees thereof are increased. For example, such peripheral documents whose totalization value as to distances thereof is smaller than, or equal to a predetermined threshold value may be alternatively extracted.

Figure 16:
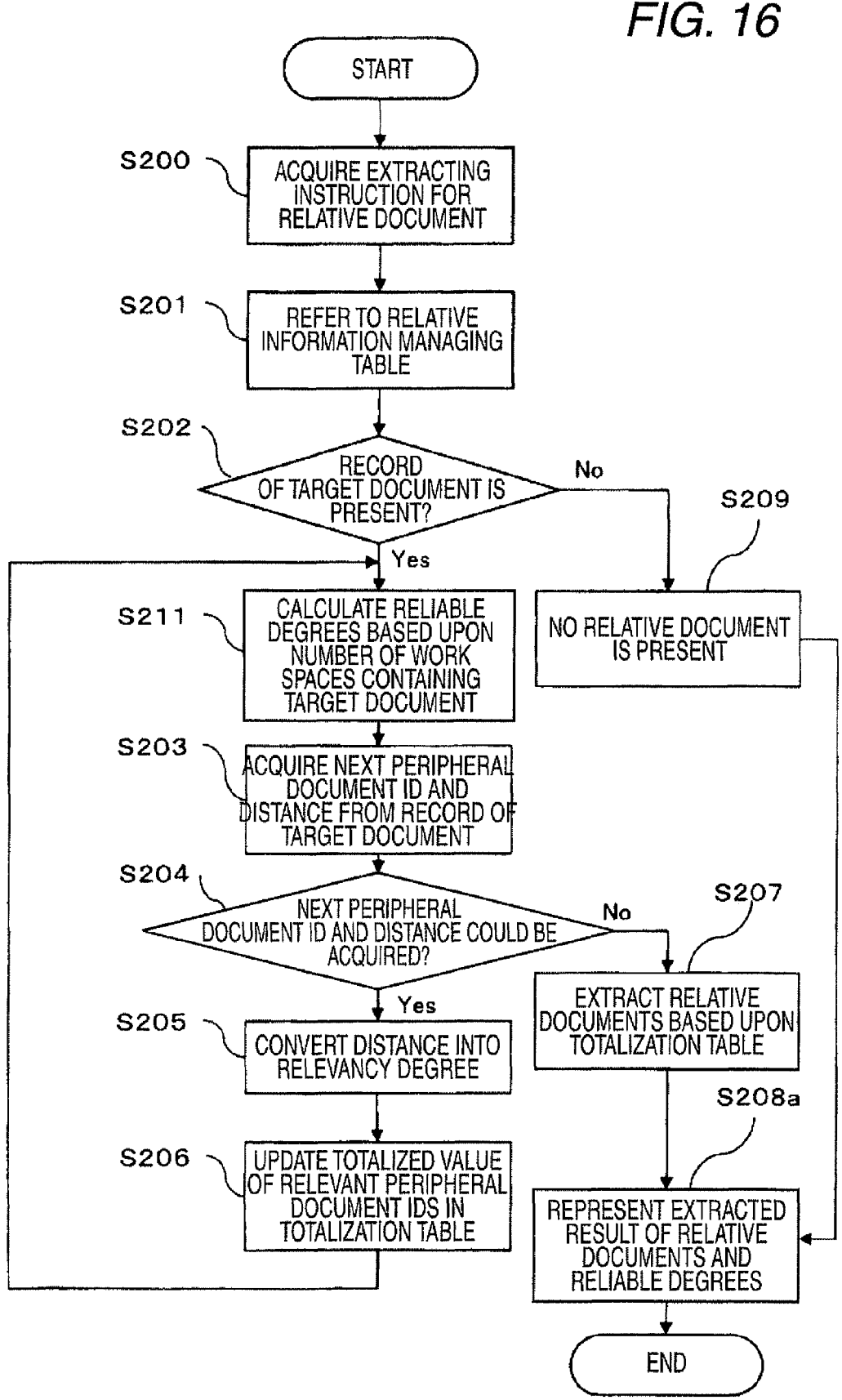
FIG. 16 is a flow chart for describing an example as to a process sequence of a first modification.

Next, referring to FIG. 16, a description is made of a first modification as to the above-described embodiment mode. It should be understood that the same reference numerals shown in the steps of FIG. 12 will be employed as those for denoting the similar steps shown in FIG. 16, and explanations thereof will be omitted.

In this first modification, information about a reliable degree is added with respect to an extracted result of a relative document which is represented by the relative document representing unit 130. A reliable degree is calculated based upon a number of workspaces containing a target document for instructing to extract a relative document. In other words, roughly speaking, if a total number of workspaces containing a target document is increased, then an extracted result of relative documents may be reflected from a larger number of samples. As a result, it is possible to say that a reliable degree of this extracted result becomes high.

As a consequence, in this first modification, when it is so determined that the record of the target document is present in the relative information managing DB 120 in the step S202, since the document managing server 100 totalizes workspace IDs which are contained in the record of the target document in the step S211, a total number of workspaces containing this target document is calculated, and then, the calculated total number of the workspaces is converted into a reliable degree by employing a predetermined function. Thereafter, in a step S208a, the relative document representing unit 130 represents such an extracted result screen to the user, on which the extracted result of the relative document has been represented in connection with the reliable degree thereof.

Figure 18:
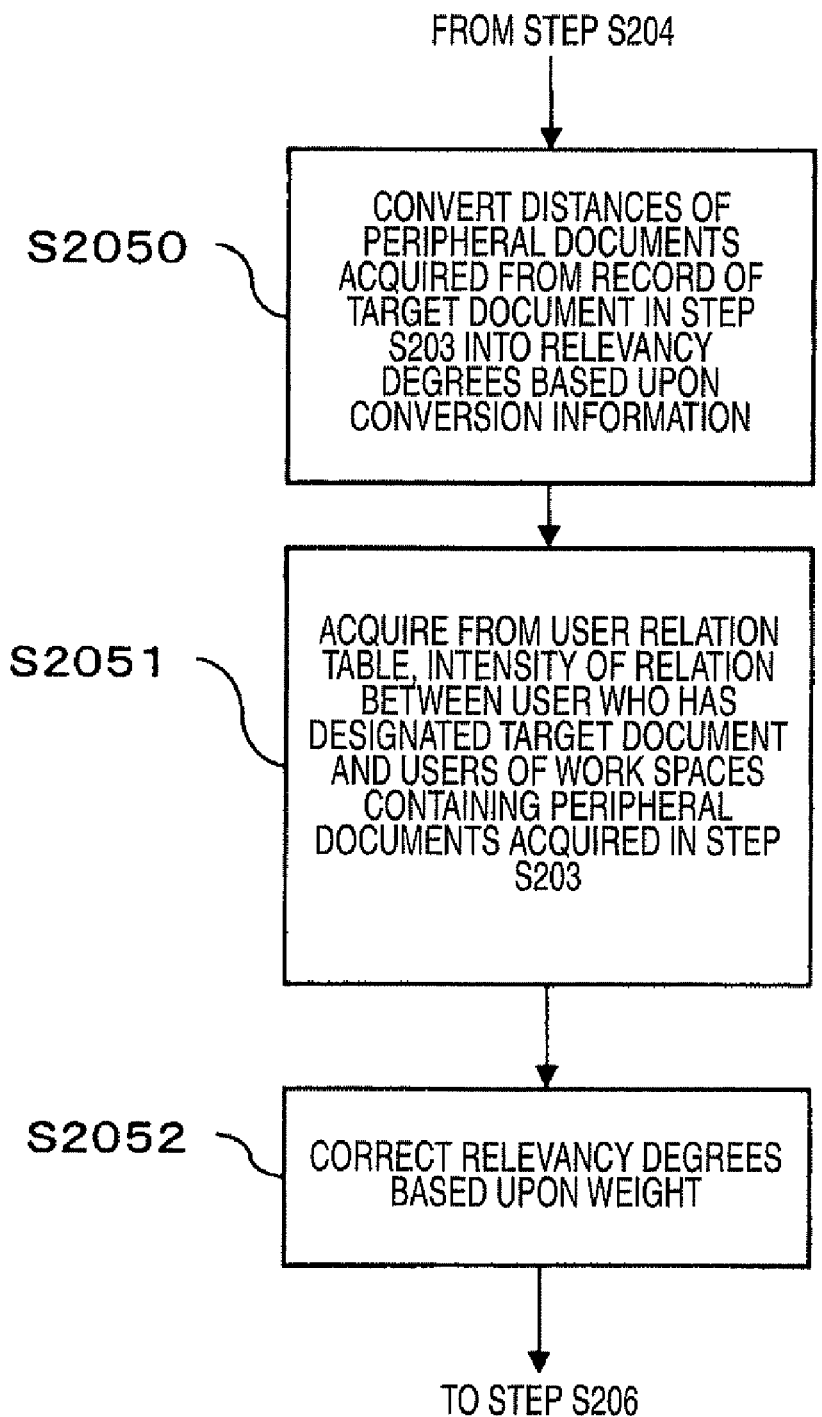
FIG. 18 is a flow chart for describing an example as to a process sequence of the second modification.

Next, referring to FIG. 17 and FIG. 18, a description is made of a second modification. In this second modification, based upon a relation between a user (will be referred to as "user U" hereinafter) who has instructed to extract a relative document with respect to a target document, and another user (will be referred to as "user V" hereinafter) who corresponds to each of respective workspaces "S", a relevancy degree between the target document "A" and other electronic documents "X" present in each of these workspaces "S" is corrected. That is to say, the relevancy degree between the target document "A" and the electronic document "X" present in the workspace "S" is corrected in such a manner that the stronger the relation between the user "U" and the user "V" becomes, the higher the relevancy degree becomes.

In order to realize this second modification, the document managing server 100 has stored thereinto, for example, a user relation table exemplified in FIG. 17. The user relation table of FIG. 17 has contained thereinto values of intensities (weights) of the relation between the users. This user relation table has been formed in a symmetric manner by sandwiching a diagonal line (diagonal line indicates relation between same users). For instance, assuming now that users described on the ordinate are recognized as the users "U" who have designated the target documents, respective cells contained in rows of the user relation table corresponding to the users indicate weights of the users "V" of the respective workspaces with respect to the users "U." The lager the weight value becomes, the stronger the relation between the users becomes.

Figure 12:
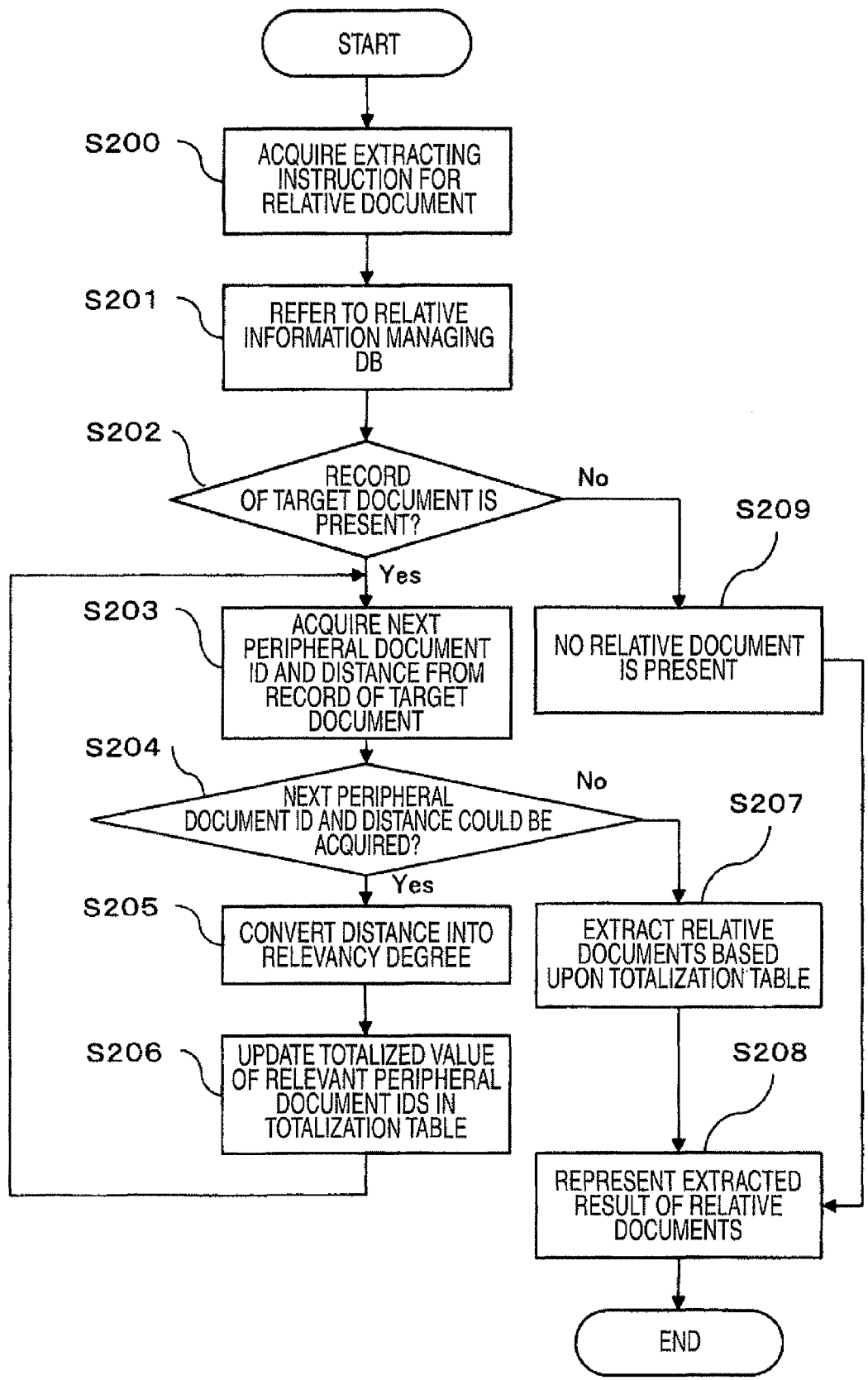
FIG. 12 is a flow chart for describing an example as to a process sequence of a document managing server when an extraction of a relative document is instructed.

A process operation of the above-described second modification can be realized by, for example, changing the step S205 contained in the sequential process for extracting the relative document exemplified in either FIG. 12 or FIG. 16 into such steps exemplified in FIG. 18. In other words, in the sequential process of FIG. 18, the relevancy degree totalizing unit 126 converts the distances of the peripheral documents acquired from the record of the target document in the step S203 (refer to either FIG. 12 or FIG. 16) into relevancy degrees based upon the conversion information 128 (step S2050). The above-described converting process operation may be executed in a similar manner to that of the above-described step S205. Also, the relevancy degree totalizing unit 126 acquires such a weight value from the user relation table exemplified in FIG. 17 (step S2051). The weight value indicates intensity of the relation between the user "U" who has designated the target document in the step S200 (refer to FIG. 12 etc.), and the user "V" of the workspace containing the peripheral documents acquired in the step S203. In this case, for example, a row of the user "U" is selected from the ordinate of the user relation table, and a column of the user "V" is selected from the abscissa thereof, and then, a weight value of a cell where the row is intersected to the column is acquired. It should also be understood that in the process operation of the step S2051, for instance, in such a case that the information of the peripheral document "B" of the head has been acquired from the record of the workspace ID "1" of the relative information managing DB 120 in the step S203, a user corresponding to this workspace ID "1" may be acquired from the workspace DB 110, and thus, the acquired user may be recognized as the above-described user "V."

Then, the relevancy degree totalizing unit 126 corrects the relevancy degree acquired in the step S2050 based upon this weight value (step S2052). The correction of the relevancy degree may be carried out by performing a predetermined calculation, for instance, by adding a weight value to the relevancy degree, or by multiplying the relevancy degree by the weight value. Conversely speaking, the weight value may be previously determined as such a value responding to this calculation. Then, the totalization table may be updated in the step S206 (refer to FIG. 12 etc.) based upon the relevancy degree corrected in the step S205.

In the second modification of FIG. 18, at the stage for totalizing the relevancy degrees after the instruction for extracting the relative document has been received, this relevancy degree has been corrected in response to the intensity of the relation between the users, which may merely constitute one example. Instead of this correction, for instance, at such a stage that either a distance or a relevancy degree is registered in each of the peripheral document entries of the relative information managing DB 120, either the distance or the relevancy degree may be corrected based upon the weight value in response to the intensity of the relation between the users.

Also, it is not necessarily required to employ such a user relation table as indicated in FIG. 17. Instead of this user relation table, for example, a weight of a relation may be alternatively acquired in accordance with the below-mentioned rule. That is, in this rule, in such a case that both the user "U" and the user "V" have belonged to the same group within an organization, the weight is increased, as compared with that when both the user "U" and the user "V" do not belong to the same group.

Figure 20:
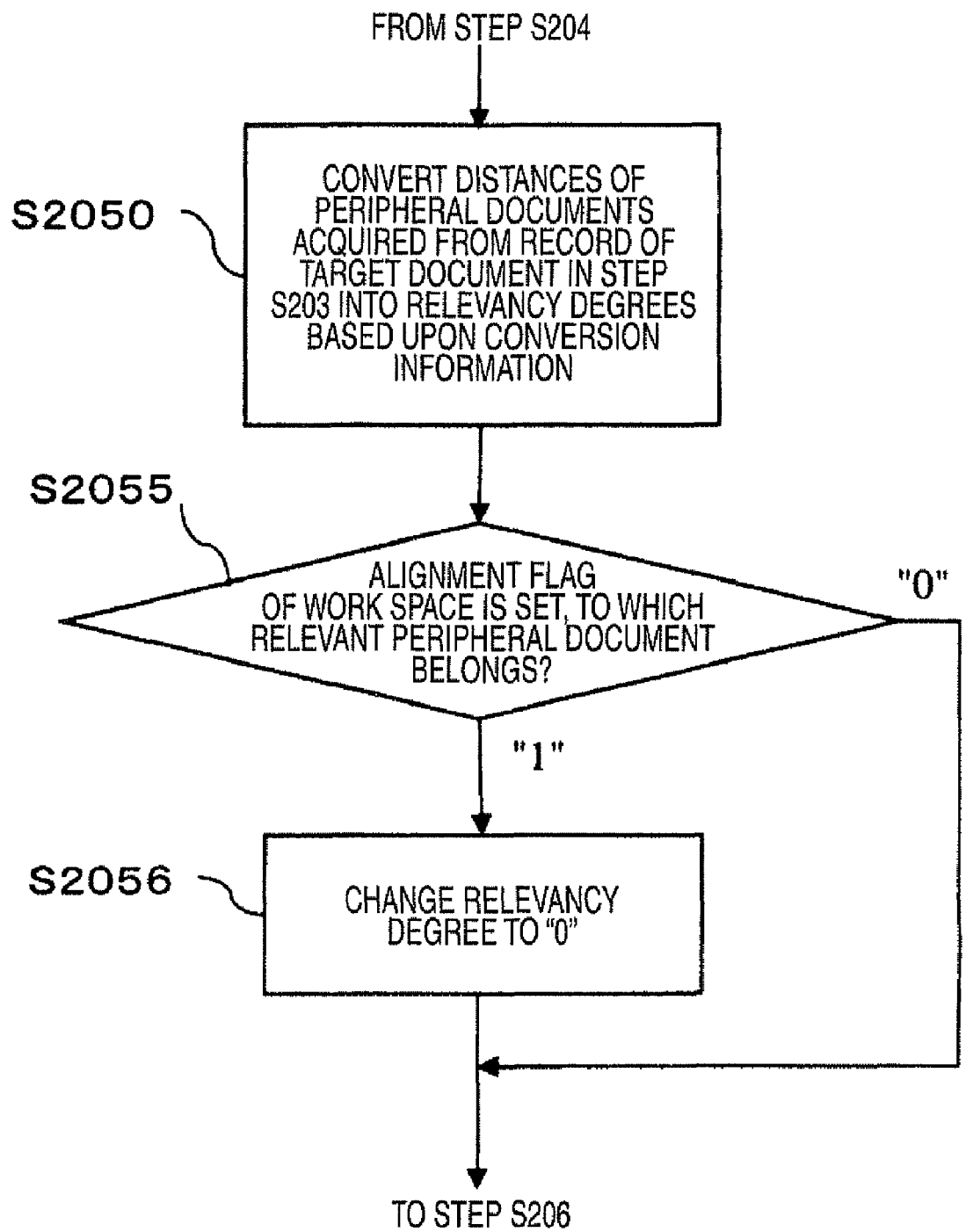
FIG. 20 is a flow chart for describing an example as to a process sequence of the third modification.

Next, referring to FIG. 19 and FIG. 20, a description is made of a third modification. In this third modification, an automatic alignment of electronic documents within a workspace is considered. For instance, among operating systems (OSs), a certain operating system has been equipped with an automatic aligning function. That is, in this operating system, object groups on a desktop screen are automatically aligned in this order of attribute values such as names and update day/time. Alternatively, either the workspace processing unit 12 or the workspace processing unit 112 (refer to FIG. 1 and FIG. 16) may similarly have such a function that respective electronic documents within a workspace are automatically re-aligned in this order of designated attribute values. In the case that the electronic documents within the workspace are automatically aligned due to the above-described function, since distances among these electronic documents within the workspace may not correctly reflect an intention of a user, these distances may not be properly employed in order to predict intensities of relevancy degrees among the electronic documents. As a consequence, in the third modification, in such a case that the workspace is automatically aligned, the distances among the electronic documents within this workspace are not reflected to a totalized value of relevancy degrees thereof.

To this end, as one example, such an alignment flag information as exemplified in FIG. 19 is given to the workspace DB 110. In the example of FIG. 19, an alignment flag is contained in the alignment flag information every workspace. In the case that electronic documents in a workspace is automatically aligned, an alignment flag of this workspace is set to "1." Also, for example, in such a case that any one of electronic documents within a workspace is moved by way of a so-called "Drag & Drop" operation, an alignment flag of this workspace is set to "0."

For instance, as shown in FIG. 20, after the relevancy degree totalizing unit 126 has converted the distances of the peripheral documents into the relevancy degrees in the step S2050, the relevancy degree totalizing unit 126 refers to this alignment flag information so as to determine a value of an alignment flag of the workspace to which the above-described peripheral documents belong (step S2055). As a result of the determination, if the alignment flag is "1", then the relevancy degree totalizing unit 126 changes the relevancy degree calculated in the above-described step S2050 into "0" (this zero value may merely constitute one example, so that predetermined value other than 0 may be alternatively employed) in a step S2056. In a step S206, the relevancy degree totalizing unit 126 reflects the above-described relevancy degree of "0" onto the totalization table. On the other hand, if the alignment flag is "0", then the relevancy degree totalizing unit 126 directly reflects the relevancy degree calculated in the step S2050 onto the totalization table in the step S206.

It should also be noted that in the example of FIG. 20, when the alignment flag is "1" at the stage for totalizing the relevancy degree, the relevancy degree has been changed into the predetermined value of "0", which may merely constitute one exemplification. Alternatively, when the relative information managing DB 120 is updated, the relevancy degree totalizing unit 126 may refer to alignment flag information, and may change either distances of respective peripheral documents or relevancy degree values thereof present in a record of such a workspace whose alignment flag is "1" into a predetermined value.

In the above-described embodiment mode and modifications thereof, based upon the totalized result of the distances (otherwise, relevancy degrees) between the same target document and other respective peripheral documents within each of the workspaces, the totalized value of the relevancy degrees of the respective peripheral documents with respect to the target document have been calculated. That is to say, in the systems described in the above-explained embodiment mode and modifications, identities among electronic documents in each of the workspaces must be determined. In the simplest determining example, while document IDs capable of exclusively identifying electronic documents are given to the respective electronic documents, it is possible to merely determine that such electronic documents whose document IDs are equal to each other are identical to each other. However, the method for determining the identities in the above-described embodiment mode and modifications is not limited only to the above-explained simple determining method.

For example, the identities among the electronic documents may be alternatively determined based upon one piece, or more pieces of attributes (for instance, document ID, document name, document forming day/time, update day/time, document forming person, format of file, data size) as to each of the electronic documents. As an example, while a set of one, or more pieces of attribute values used in a determination is regarded as one vector, in such a case that a distance between vectors of two electronic documents is shorter than, or equal to a predetermined threshold value, it is possible to regard that these electronic documents are identical to each other.

Also, there are some cases that not only symbol images of electronic documents themselves, but also symbol images of reference information files (namely, so-called "short cut") which indicate electronic documents may be alternatively arranged in a workspace. In this alternative case, it is possible to determine that an electronic document present in the workspace is identical to the reference information file which designates this electronic document within another workspace.

Alternatively, while such a database is provided which registers thereinto electronic documents which are clearly regarded as the identical electronic documents by the user, even when document IDs are not made coincident with each other, such a determining idea may be conceived, namely, it is possible to determine that such electronic documents are identical to each other, and these electronic documents have been registered as the identical electronic documents in the above-described database.

In the above-described embodiment mode and modifications, either the distances or the relevancy degrees have been totalized over all of the workspaces registered in either the workspace DB 10 or DB 110, which may merely constitute one example. Instead of the above-described example, such a workspace of the user who has instructed to extract a relevant document may be alternatively deleted from a range of a totalization. This idea is conceivable as follows: That is, since the user can sufficiently grasp the relative relationship among the electronic documents present in the own workspace, the own workspace is deleted from the range of the totalization in order to achieve such a purpose that the user wants to grasp such a relative document which is not grasped by the user. The workspace of the user who has instructed to extract the relative document can be deleted from the range of the totalization by referring to the user IDs of the respective workspaces registered in the workspace DB 10.

In the above-described embodiment mode and modifications, the relevancy degrees among the electronic documents have been acquired based upon the distances among the electronic documents on the workspace, which may merely constitute one example. Generally speaking, relevancy degrees among electronic documents may be alternatively acquired based upon a relation among arranging positions of the respective electronic documents on a workspace. The above-described distances may correspond to one sort of the above-explained relations. Also as another example, for instance, in such a case that positional coordinates of document information are expressed by an X/Y coordinate system, a relevancy degree among electronic documents may also be alternatively acquired by utilizing only one coordinate value within an X coordinate value and a Y coordinate value. Concretely speaking, the following technical idea can be conceived: That is, it is so determined that a relevancy degree between two electronic documents having positional coordinates of the same X-coordinate values (even if Y-coordinate values of both electronic documents are different from each other) is high, whereas it so determined that a relevancy degree between two electronic documents whose X-coordinate values are different values larger than, or equal to a predetermined value (even when Y-coordinate values thereof are equal to each other) is low. Since such a structure is employed, for example, it may be so determined that a relevancy degree of electronic documents located in the same "row" is high. As apparent from the foregoing description, another structure may be alternatively employed in which while one of coordinate values is not completely considered, weighting values as to two coordinate values may be varied when a relevancy degree is determined. Furthermore, the relevancy degree determining methods for the respective electronic documents may be alternatively changed every workspace, or every user of a workspace.

Figure 21:
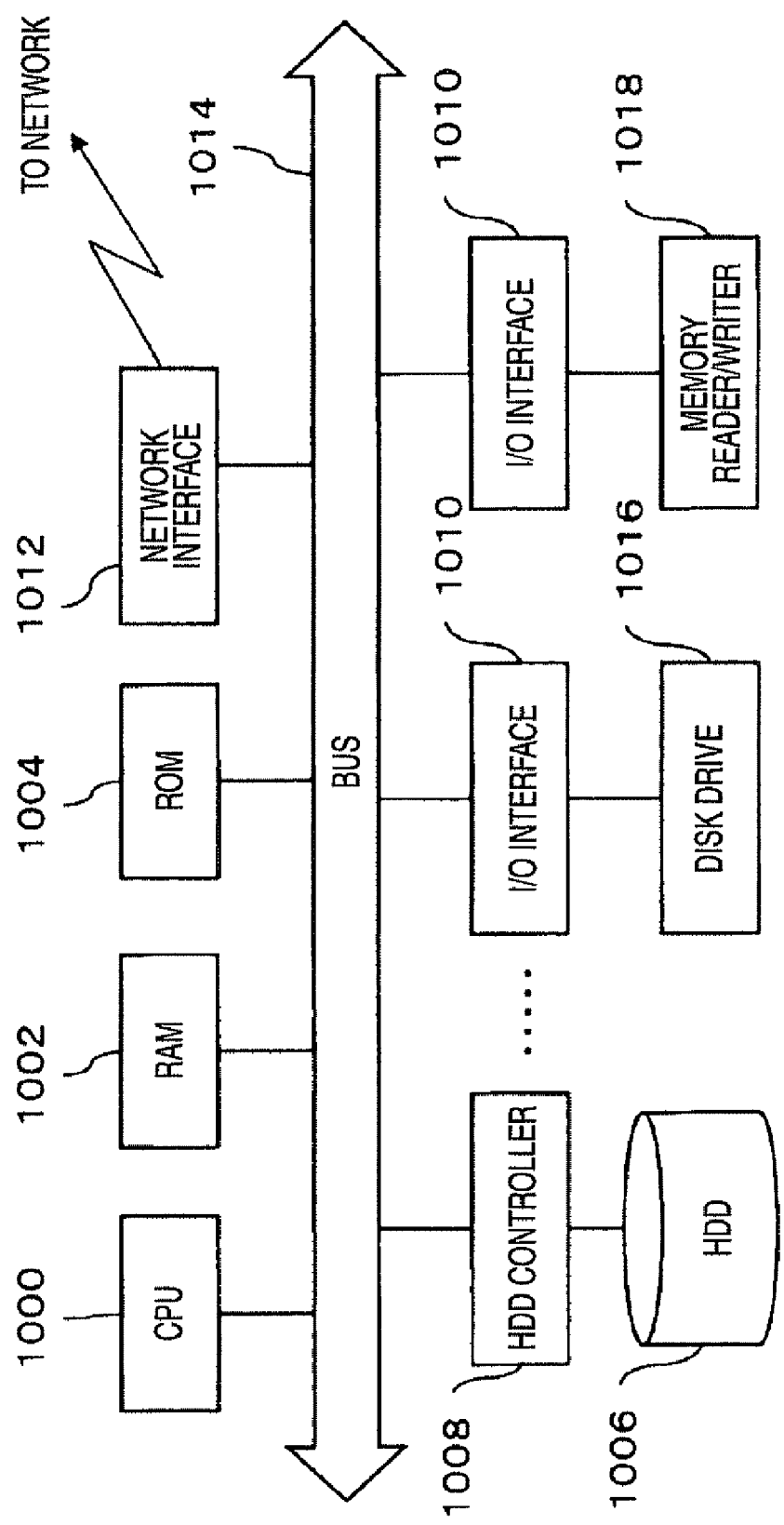
FIG. 21 is a diagram for showing an example as to a hardware structure of a computer.

The above-described document managing systems exemplified in the above-explained embodiment mode and respective modifications may be realized by, for example, causing a general-purpose computer to execute programs which indicate the process operations of the above-described respective function modules. In this case, the general-purpose computer is equipped with a circuit arrangement as hardware, for instance, as represented in FIG. 21, in the circuit arrangement, a microprocessor such as a CPU 1000, a memory (primary storage) such as a random access memory (RAM) 1002 and a read-only memory (ROM) 1004, an HDD controller 1008 for controlling an HDD (hard disk drive) 1006, various sorts of I/O (input/output) interface 1010, a network interface 1012, and the like have been connected to each other via, for example, a bus 1014. The network interface 1012 controls to connect a network such as a LAN to the own circuit arrangement. Also, alternatively, a disk drive 1016, a memory reader/writer 1018, and the like may be connected with respect to the above-described bus 1014 via, for example, the I/O interface 1010. The disk drive 1016 performs read and/or write operations with respect to a portable type disk recording medium such as a CD and a DVD. The memory reader/writer 1018 performs read and/or write operation with respect to the programs into which the process contents of the above-exemplified function modules have been described are saved through the recording medium such as a CD and a DVD, or via a communication means such as a network in a fixed storage apparatus such as a hard disk drive, and then, is installed in the computer. The programs stored in the fixed storage apparatus are read into the RAM 1002, and then, is executed by the microprocessor such as the CPU 1000, so that the above-exemplified function module groups may be realized. It should also be noted that a partial function module group, or an entire module group as to these function module groups may be alternatively constructed as a hardware circuit such as an exclusively-used LSI (Large-scale Integration), an ASIC (Application Specific Integrated Circuit), an FPGA (Field Programmable Gate Array), or the like.

It should also be understood that either the respective function modules of the system shown in FIG. 1 or the respective function modules of the document managing server 100 indicated in FIG. 6 may be arranged in a plurality of apparatuses provided on a network in a distribution manner, and the functions as to either the above-described system or the document managing system 100 may be alternatively realized. Furthermore, while a plurality of workspace DBs 10, or 110 are present, information about workspaces of these plural DBs may be alternatively totalized.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A relative document representing system comprising:
   a first storage that stores an arranging position of each of a plurality of electronic documents arranged in each of a plurality of workspaces;
   a receiving unit that receives a designation of a target electronic document from a user on a display screen formed based on display information, the display information being produced by referring to information stored in the first storage with respect to one workspace selected from the plurality of workspaces, each of the electronic documents being arranged at an arranging position corresponding to the one workspace;

a specifying unit that specifies an interest workspace, in which an electronic document regarded as an identical electronic document to the target electronic document has been arranged by referring to the information stored in the first storage, the interest workspace being other than the one workspace in which the target electronic document is arranged;

a calculating unit that calculates relevancy degrees of each of the electronic documents with respect to the target electronic document within the interest workspace based on an arranging position of each of the electronic documents within the interest workspace specified by the specifying unit and an arranging position of an electronic document which is regarded as an identical electronic document to the target electronic document within the interest workspace; and a representing unit that represents information indicating an electronic document related to the target electronic document among each of the electronic documents based on the relevancy degrees of each of the electronic documents calculated by the calculating unit with respect to the target electronic document.

2. The relative document representing system as claimed in claim 1, further comprising:

a second storage that stores a user corresponding to each of the workspaces, and that stores determination information for determining intensity of relations among the users;

a determining unit that determines intensity of a relation between the user who has made the designation with respect to the receiving unit and the user corresponding to the interest workspace based on the determination information; and a correcting unit that corrects the relevancy degrees of each of the electronic documents with respect to the target electronic document within the interest workspace in response to an intensity of the relation determined by the determining unit, the relevancy degrees being calculated by the calculating unit, wherein the representing unit represents information indicating an electronic document related to the target electronic document among each of the electronic documents based on the relevancy degrees corrected by the correcting unit.

3. The relative document representing system as claimed in claim 1, wherein the specifying unit, even when the specifying unit finds out the workspace where the electronic document regarded as the identical electronic document to the target electronic document has been arranged, whose designation is received by the receiving unit, within the workspaces other than the workspace corresponding to the display information provided by the receiving unit, in a case where the specifying unit detects that an electronic documents within the found workspace is under align-processed condition, does not employ the found workspace as the interest workspace.

4. The relative document representing system as claimed in claim 1, further comprising:

a totalization value calculating unit that, in a case where the specifying unit specifies a plurality of interest workspaces, calculates a totalization value as to the relevancy degrees of the respective electronic documents with respect to the target electronic document by totalizing the relevancy degrees of each of the electronic documents with respect to the target electronic document within the interest workspaces every identical electronic document over the interest workspaces, wherein the representing unit represents information indicating an electronic document related to the target electronic document among each of the electronic documents based on the relevancy degree totalized value calculated by the totalization value calculating unit.

5. The relative document representing system as claimed in claim 4, further comprising:

a calculating unit that calculates a reliable degree based on a total number of the interest workspaces specified by the specifying unit, wherein the representing unit represents the information indicating the electronic document related to the target electronic document in correspondence with the reliable degree.

6. The relative document representing system as claimed in claim 1, wherein the calculating unit calculates relevancy degrees of the electronic documents with respect to the target electronic document within a workspace corresponding to the display information based on an arranging position of each of the electronic documents within a workspace corresponding to the display information provided by the receiving unit, and an arranging position of the target electronic document.

7. A relative document representing method comprising:

storing an arranging position of each of electronic documents arranged in each of a plurality of workspaces;

receiving a designation of a target electronic document from a user based on display information, the display information being produced by referring to information stored with respect to one workspace selected from the plurality of workspaces, each of the electronic documents being arranged at an arranging position corresponding to the one workspace;

specifying an interest workspace in which an electronic document regarded as an identical electronic document to the target electronic document has been arranged by referring to the stored information, the interest workspace being other than the one workspace in which the target electronic document is arranged;

calculating relevancy degrees of each of the electronic documents with respect to the target electronic document within the interest workspace based on an arranging position of each of the electronic documents within the specified interest workspace and an arranging position of the electronic document which is regarded as the identical electronic document to the target electronic document within the interest workspace; and representing information indicating an electronic document related to the target electronic document among each of the electronic documents based on the relevancy degrees of each of the calculated electronic documents with respect to the target electronic document.

8. A non-transitory computer readable medium storing a program causing a computer to execute a process for representing a relevant document, the process comprising:

> storing an arranging position of each of electronic documents arranged in each of a plurality of workspaces;
>
> receiving a designation of a target electronic document from a user based on the provided display information, the display information being produced by referring to information stored with respect to one workspace selected from the plurality of workspaces, each of the electronic documents being arranged at an arranging position corresponding to the one workspace;
>
> specifying an interest workspace in which an electronic document regarded as an identical electronic document to the target electronic document has been arranged by referring to the stored information, the interest workspace being other than the one workspace in which the target electronic document is arranged;
>
> calculating relevancy degrees of each of the electronic documents with respect to the target electronic document within the interest workspace based on an arranging position of each of the electronic documents within the specified interest workspace and an arranging position of the electronic document which is regarded as the identical electronic document to the target electronic document within the interest workspace; and
>
> representing information indicating an electronic document related to the target electronic document among each of the electronic documents based on the relevancy degrees of each of the calculated electronic documents with respect to the target electronic document.

* * * * *